(12) United States Patent
Miao

(10) Patent No.: US 11,355,021 B1
(45) Date of Patent: Jun. 7, 2022

(54) NODAL NETWORK INFRASTRUCTURE FOR UNMANNED AERIAL VEHICLE OPERATIONS AT SCALE

(71) Applicant: Birdstop, Inc., San Francisco, CA (US)

(72) Inventor: Keith Miao, San Francisco, CA (US)

(73) Assignee: Birdstop, Inc., San Francisco, CA (US)

( * ) Notice: Subject to any disclaimer, the term of this patent is extended or adjusted under 35 U.S.C. 154(b) by 0 days.

(21) Appl. No.: 17/194,185

(22) Filed: Mar. 5, 2021

(51) Int. Cl.
*G08G 5/00* (2006.01)
*B64F 1/18* (2006.01)
*B64C 39/02* (2006.01)

(52) U.S. Cl.
CPC ............ *G08G 5/0069* (2013.01); *B64F 1/18* (2013.01); *G08G 5/0013* (2013.01); *G08G 5/0026* (2013.01); *G08G 5/0034* (2013.01); *G08G 5/0039* (2013.01); *G08G 5/0043* (2013.01); *B64C 39/024* (2013.01); *B64C 2201/14* (2013.01)

(58) Field of Classification Search
CPC .. G08G 5/0013; G08G 5/0026; G08G 5/0034; G08G 5/0039; G08G 5/0043; G08G 5/0069; B64F 1/18
See application file for complete search history.

(56) References Cited

U.S. PATENT DOCUMENTS

| | | | | |
|---|---|---|---|---|
| 2018/0293898 | A1* | 10/2018 | Redmann | G08G 5/006 |
| 2018/0327091 | A1* | 11/2018 | Burks | B64C 39/10 |
| 2019/0383052 | A1* | 12/2019 | Blake | B60L 53/12 |
| 2020/0017237 | A1* | 1/2020 | Walker | G01G 19/002 |
| 2020/0019925 | A1* | 1/2020 | Tokhtabaev | G08G 5/0043 |
| 2020/0349852 | A1* | 11/2020 | DiCosola | G06Q 10/0832 |
| 2021/0005091 | A1* | 1/2021 | Raabe | G08G 5/0069 |
| 2021/0125503 | A1* | 4/2021 | Henry | G08G 5/0069 |
| 2021/0312822 | A1* | 10/2021 | Nakabayashi | G08G 5/02 |

* cited by examiner

*Primary Examiner* — Andrew W Bee
(74) *Attorney, Agent, or Firm* — Cognition IP, P.C.; Edward Steakley

(57) ABSTRACT

Systems and methods describe providing field data collection using unmanned aerial vehicles (UAVs). The system receives a request, from a client device, to perform an aerial mission. The system selects a launch hangar, from a group of launch hangars that are in networked communication, to launch a UAV to perform the aerial mission. The system transmits to the UAV from the selected launch hangar, instructions to perform the aerial mission. The system deploys from the selected launch hangar, the UAV to perform the aerial mission and obtain sensor data pertaining to a structure and/or a geographic area. The system receives the UAV at a return hangar which receives the obtained sensor data from the UAV.

23 Claims, 15 Drawing Sheets

Hangar Suitability Score

| Hangar ID | Suitability Score | Rank | Selected |
|---|---|---|---|
| CA000257 | 97 | 1 | Yes |
| CA000259 | 94 | 2 | Yes |
| CA000258 | 82 | 3 | No |
| CA000260 | 81 | 4 | No |
| CA000792 | 76 | 5 | No |
| CA002819 | 54 | 6 | No |
| NV00723 | 23 | 7 | No |
| NV000724 | 22 | 8 | No |

...

| | | | |
|---|---|---|---|
| FL001067 | 0 | 46098 | No |
| FL001068 | 0 | 46099 | No |

FIG. 10

NODAL NETWORK INFRASTRUCTURE FOR UNMANNED AERIAL VEHICLE OPERATIONS AT SCALE

FIELD OF INVENTION

The present invention relates generally to unmanned aircraft systems, and more particularly, to systems and methods for providing a networked field data collection platform using unmanned aerial vehicles.

BACKGROUND

The inspection and monitoring of physical field assets is an important part of operations and maintenance in many industries. Regular inspections, during which field data is collected and issues with assets are detected and fixed in a timely manner, can contribute to increased productivity, prevented hazards, and prudent maintenance of asset integrity. Furthermore, inspections are often mandated due to regulations, and asset owners must report regularly to remain in compliance. A wide range of physical field assets are frequently in need of data collection across industries, including but not limited to industrial infrastructure (e.g., oil and gas wells, telecommunications towers, electricity transmission systems, quarries and mines, and refineries), transport infrastructure (e.g., bridges, roads, and railways), agricultural assets (e.g., livestock, field crops, and orchards), logistics assets (e.g., warehouses, stockyards, and ports), and more. Traditionally, such data is collected by human inspectors who must travel to remote and/or hazardous locations repeatedly in order to capture the necessary information. In some cases, it is required of these inspectors to climb tall structures to capture three-dimensional data. In other cases, cranes, scaffolding, or helicopters must be utilized. Such measures lead to safety concerns for inspectors, high costs from deploying personnel with expensive equipment, or both. Such measures also result in data quality issues, including a lack of standardization and frequent delays in receiving vital field insights.

More recently, Unmanned Aerial Vehicles (hereinafter "UAV", "UAVs"), also known colloquially as "drones", have become an essential part of the inspection toolkit. When deployed in a full system which enables the UAVs to operate safely and effectively, the suite is considered an Unmanned Aircraft System (hereinafter "UAS"). Presently, most applications of UAV technology involve human operators piloting UAVs at the sites of inspection, defeating the point of "unmanned" systems by requiring personnel to be manning these systems onsite. More recently, regulation has begun permitting a new form of UAS whereby the operator does not need to be physically present. This new form of operations, often called "drone-in-a-box", usually involves a hangar located onsite that houses and deploys a UAV on an automated or remotely operated basis without personnel onsite. Data is collected and returned to the hangar and delivered through the Internet to relevant users of field data. These data users can be anywhere in the world.

While this type of UAS offers significant benefits over the traditional method of sending personnel physically onsite, the existing solutions using this concept are difficult and expensive to maintain and deploy. Such existing technologies in the "drone-in-a-box" category use a proprietary and fully integrated software-hardware stack which can only accommodate one specific, proprietary UAV, a specific set of sensors, and/or specific software. This has the effect of locking users into one proprietary ecosystem for all software and hardware. As a result, the existing solutions are rarely scalable, extensible, or up to date with the rapid evolution of UAS technology.

Thus, there is a need in the field of UAV and UAS technology to create new and useful systems and methods for providing a platform that can serve as the operating system and backbone of field data collection at a scale, cost, and ease that is accessible to the broader market. The source of the problem, as discovered by the inventor, is a lack of scalable, interoperable systems that can unlock automated operations for the mass market of commercial off-the-shelf UAV technology. Amongst other attributes, such a system needs to accommodate different UAVs, the existing UAS ecosystem, and different inspection workflows currently in use by industry.

SUMMARY

The invention overcomes the existing problems in maintaining field asset integrity by providing a field data collection platform using unmanned aircraft. This allows for intelligent, automated UAV deployments that can be configured to modularly scale (across, e.g., different aircraft and different flight software). The platform employs flight operations software capable of instructing one or more UAV(s) to fly from one or more launch hangar(s) to one or more physical field asset(s) and capture the relevant field data. A respective UAV is then received at the most appropriate return hangar, where the captured field data is retrieved and processed. The benefits of the invention over today's methods include significantly reducing costs and hazards of field data collection; allowing for scalability through additional hangars which can communicate with one another in a network (e.g., a mesh network); compatibility across third party technology (e.g., the latest UAVs and payloads adopted by the market); integration with existing data systems for field data; scheduled and on-demand docking and maintenance of UAVs; remote management of UAV fleets; and more.

One embodiment relates to systems and methods for providing a field data collection platform using UAVs. The system generates and/or receives software instructions associated with a data capture flight routine, then launches a UAV from an optimal launch hangar to perform the routine. The launch includes selecting a flight module for the UAV based on operational and regulatory requirements, then activating the appropriate flight software module. The flight software module instructs the UAV to fly to and capture data at the relevant field asset site. The system then receives the UAV at a return hangar, retrieves the captured field data, and processes the captured field data.

Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 10 is a figure illustrating an example calculation and ranking of hangar suitability.

DETAILED DESCRIPTION

Figure 1:
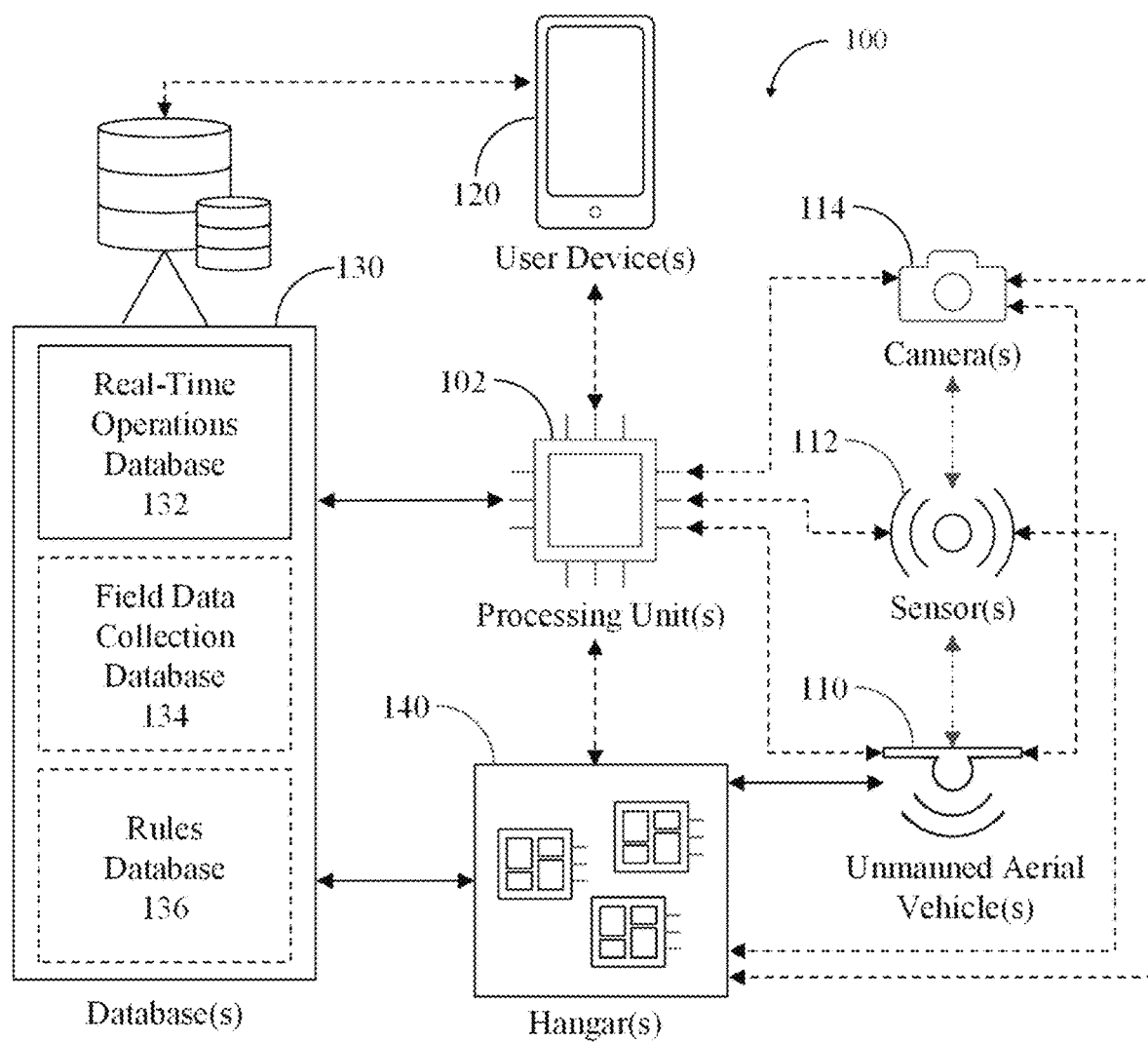
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers, or nodes, in the networked configuration.

Some embodiments are implemented by a computer system. A computer system may include a processor, a memory, and a non-transitory computer-readable medium. The memory and non-transitory medium may store instructions for performing methods and steps described herein.

FIG. 1 is a diagram illustrating an exemplary environment in which some embodiments may operate. The various components of the system may be in networked communication. In the exemplary environment 100, one or more client device(s) 120 are connected to one or more processing units 102. The processing unit 102 is connected to one or more hangar(s) 140 in a hangar network, and connected to one or more database(s) 130, including a Real-Time Operations Database 132, Field Data Collection Database 134, and/or Rules Database 136. One or more of the databases may be combined or split into multiple databases. The processing unit and/or client device in this environment may be computers, including, e.g., smartphones, tablets, desktops, or any other suitable computing devices.

The exemplary environment 100 is illustrated with only one client device and one processing unit for simplicity, though in practice there may be more client devices and/or processing units. In some embodiments, one or more client device(s) and/or processing unit(s) may be part of the same computer or device.

In one embodiment, the processing unit 102 may perform the method 400 (FIG. 4) or other method herein and, as a result, provide an automated field data collection platform using unmanned aircraft. In some embodiments, this may be accomplished via communication with the client device(s), hangar(s), or other components of the system over a network. In some embodiments, the processing unit 102 is an application hosted on a computer or similar device, or is itself a computer or similar device configured to host an application to perform some of the methods and embodiments herein.

Client device(s) 120 are devices that are configured to display information in a user interface and allow for management, customization, and/or control of the UAV(s) remotely, including, e.g., selecting physical assets for data collection, scheduling data capture routines, selecting flight routines and/or flight software modules, and/or any other suitable actions. In some embodiments, the client device 120 receives information and selects options in the form of a menu, a set of menus, a map, a set of maps, a dashboard, a set of dashboards, or other user interface elements or environments. In some embodiments, client device 120 is a computing device capable of hosting and executing one or more applications or other programs capable of sending and/or receiving information. In some embodiments, the client device 120 may be a desktop or laptop computer, mobile phone, virtual assistant, virtual reality or augmented reality device, wearable, or any other suitable device capable of sending and receiving information. In some embodiments, the processing unit 102 may be hosted in whole or in part as an application executed on the client device 120. In some embodiments, the processing unit 102 and the client device 120 may be the same device.

Database(s), including one or more of a Real-Time Operations Database 132, Field Data Collection Database 134, and/or Rules Database 136, function to store and/or maintain information such as media or data related to the UAV or hangar received from UAV(s) 110, sensor(s) 112, camera(s) 114, hangar(s) 140, user device(s) 120, or processing unit(s) 102. The database(s) may also store and/or maintain any other suitable information from third party sources for the processing unit 102 to perform elements of the methods and systems herein. In some embodiments, the database(s) can be queried by one or more components of system 100 (e.g., by the processing unit 102), and specific stored data in the database(s) can be retrieved.

Figure 2:
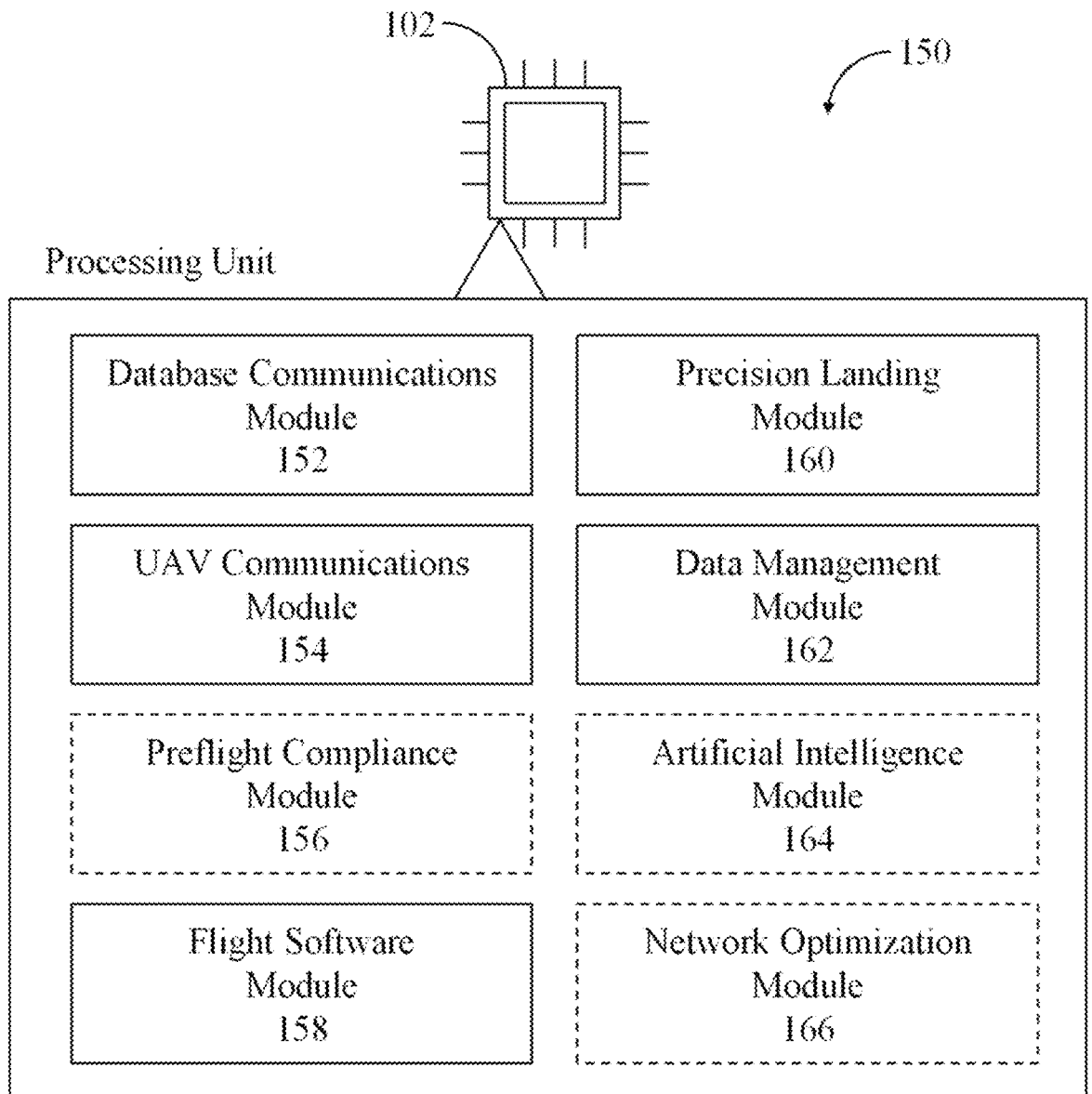
FIG. 2 is a diagram illustrating an exemplary computer system that may execute instructions to perform some of the methods herein.

FIG. 2 is a diagram illustrating an exemplary computer system 150 with software modules that may execute some of the functionality described herein. The software modules may include a Database Communications Module 152, a UAV Communications Module 154, a Preflight Compliance Module 156, a Flight Software Module 158, a Precision Landing Module 160, a Data Management Module 162, an Artificial Intelligence Module 164, and a Network Optimization Module 166.

Database Communications Module 152 includes functionality to receive information from one or more sources, such as a client device 120 which sends the information to the processing unit 102. Input information can include, e.g., flight data, control or selection signals, images or video of the UAV, positioning data for the UAV, or any other suitable information.

UAV Communications Module 154 includes functionality to communicate and receive information from a UAV. The UAV Communications Module may perform functions to continuously stay in communication with a deployed UAV and receive then current geospatial location, battery health, video feed, and other information from the UAV.

Preflight Compliance Module 156 includes functionality to perform preflight compliance checks before launching a UAV. For example, to check for Temporary Flight Restrictions (TFRs) and/or other airspace restrictions that may impact a route of flight for the UAV.

Flight Software Module 158 includes functionality to generate a flight plan or flight path and other inspection parameters to enable a UAV to perform an aerial mission, such as an inspection of a designated field asset.

Precision Landing Module 160 includes functionality to perform processes to aid in the landing of UAV at a hangar. The Landing Module 160 may communicate information such as airspeed, wind direction, and other data to assist a UAV to land at a respective hangar.

Data Management Module 162 includes functionality to perform processing and retrieval of captured field data. For example, the Data Management Module may collect from a returned UAV, sensor data captured by the UAV after performing an aerial mission, including image data, video data, point cloud data, location data, etc.

Artificial Intelligence Module 164 includes functionality to perform one or more algorithmic tasks based on one or more Artificial Intelligence (AI) models, deep learning models, computer vision models, machine learning models, or similar.

Network Optimization Module 166 includes functionality to automatically optimize the configuration of the nodes in the network, including the real-time allocation of UAVs, batteries, processing capacity, and other allocatable resources of the network.

The above modules and their functions will be described in further detail in relation to an exemplary method below.

Figure 3:
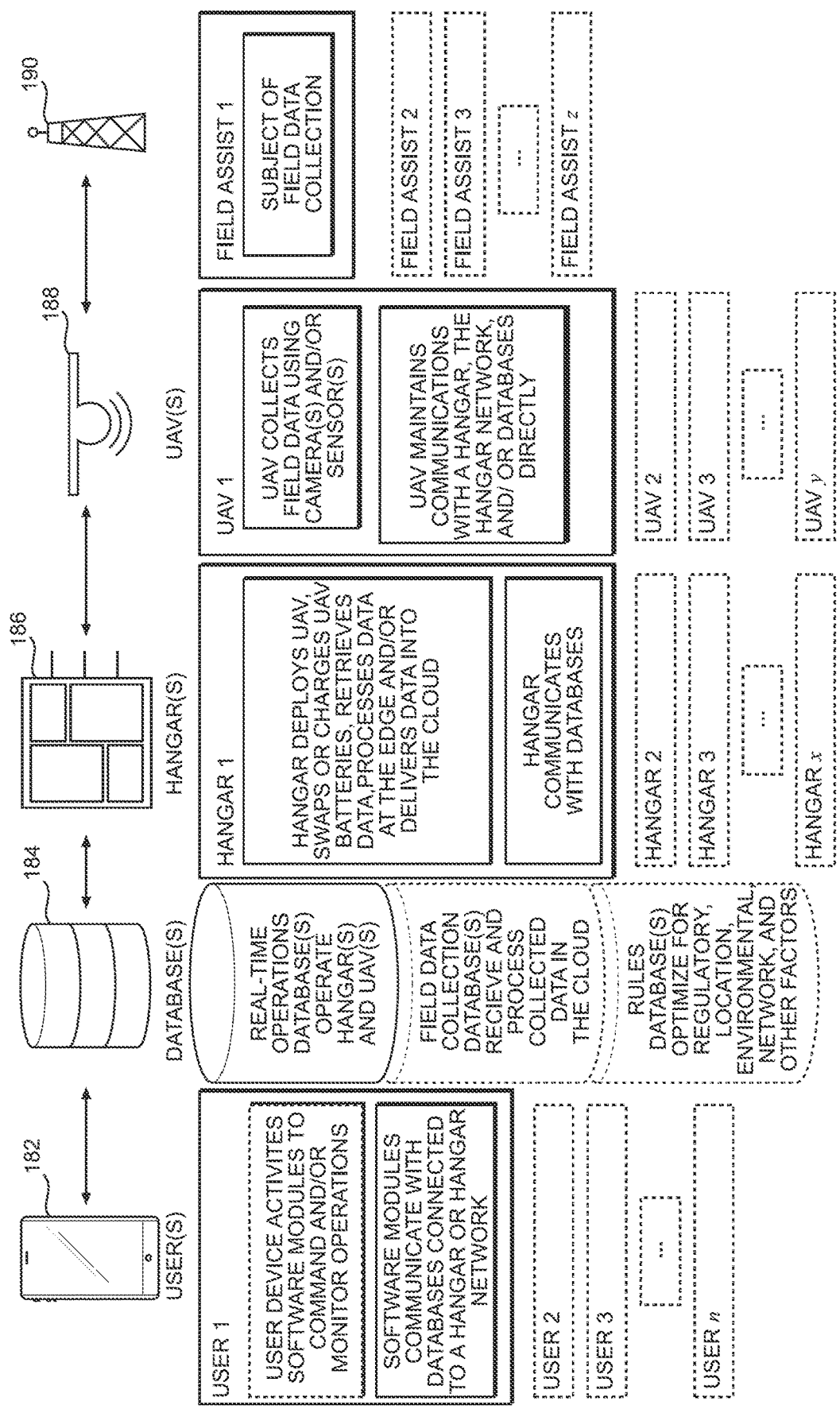
FIG. 3 is a diagram illustrating an exemplary environment that may execute instructions to perform some of the methods herein.

FIG. 3 is a diagram illustrating an additional exemplary environment in which some embodiments may operate. The exemplary environment includes end user(s) 1 through n 182, databases 184, hangar(s) 1 through x 186, UAV(s) 1 through y 188, and field asset(s) 1 through z 190.

End user 1, one of the end user(s) 182, uses an application, e.g., on a client device, to access the hangar network for deployment of a UAV to perform field data collection. End user 1, via a user device, activates software modules (e.g., a code library) to command and/or monitor operations. The software modules communicate with databases 184 connected to hangar(s) 186 within a hangar network. End users 2 through x may similarly use the application on their respective client devices to deploy UAVs for data collection missions via the hangar network. The database(s) 184 can constitute Real-Time Operations databases, Field Data Collection databases, and/or Rules databases. Real-Time Operations databases function to operate one or more hangars and one or more UAVs. Field Data Collection database(s) function to receive and process collected data in the cloud. Rules database(s) function to ensure the network and its operations are optimized for and in compliance with regulatory, locational, environmental, and other considerations.

The real-time databases 184, in turn, connect to individual hangar(s) 186 within the hangar network, which may include hangar 1 and hangar 2 through hangar x. In various embodiments, the individual hangar(s) are capable of operating hangar robotics, such as robotic mechanisms and other components; commanding UAV for data collection at data capture site(s) via flight operations software; replacing and/or charging batteries; offloading field data from the UAV; processing data on an edge server; and/or uploading data to cloud storage. Hangar 1, for example, can function to deploy a UAV, swap or charge UAV batteries, retrieve data, process data at the edge and/or deliver data into the cloud. In some embodiments, the hangars 186 are also configured to receive commands from the real-time databases 184 and send back status updates in response to the commands.

The UAVs 188 function to collect field data using onboard camera(s) and/or sensor(s). The UAVs maintain real-time communication with the hangar network and/or individual hangar(s) 186 during the completion of these processes. The UAVs 188 travel to field asset(s) 190 at data capture site(s) to collect this field data. For example, by way of illustration, a field asset may be a cell tower, a wind turbine, an agricultural field, power lines, an open pit mine, a construction site, a building structure, a disaster location, etc. The UAVs 188 may perform an aerial mission in a fully autonomous, semi-autonomous, and/or remotely controlled manner. For example, a UAV may be provided flight instructions or a flight plan where the UAV may be launched from a hangar and then autonomously fly to a location and conduct an inspection or other operations. As another example, the system 150 and/or hangars 186 may communicate instructions to the UAV while the UAV is in flight where the UAV then performs the instructions. (e.g., sending flight waypoints to the UAV where the UAV autonomously flies from a then current position to the received waypoint). In yet another example, the system 150 and/or hangars 186 may provide direct control of the UAV such as controlling the pitch, yaw, roll, speed, altitude, direction, etc. of the UAV while in flight.

In one embodiment, the user(s) 182 and database(s) 184 both operate out of field while hangar(s) 186, UAV(s) 188, and field asset(s) 190 are in the field, i.e., users and databases are both remote to the operating locations of hangars, UAVs, and field assets, and need not have their operations be dependent on proximity to any in-field components. In contrast, hangars maintain some in-field proximity to field assets, as UAVs will generally be deployed from hangars which are in proximity to field assets, to the extent possible given current availability of hangars to receive and deploy UAVs.

Figure 4:
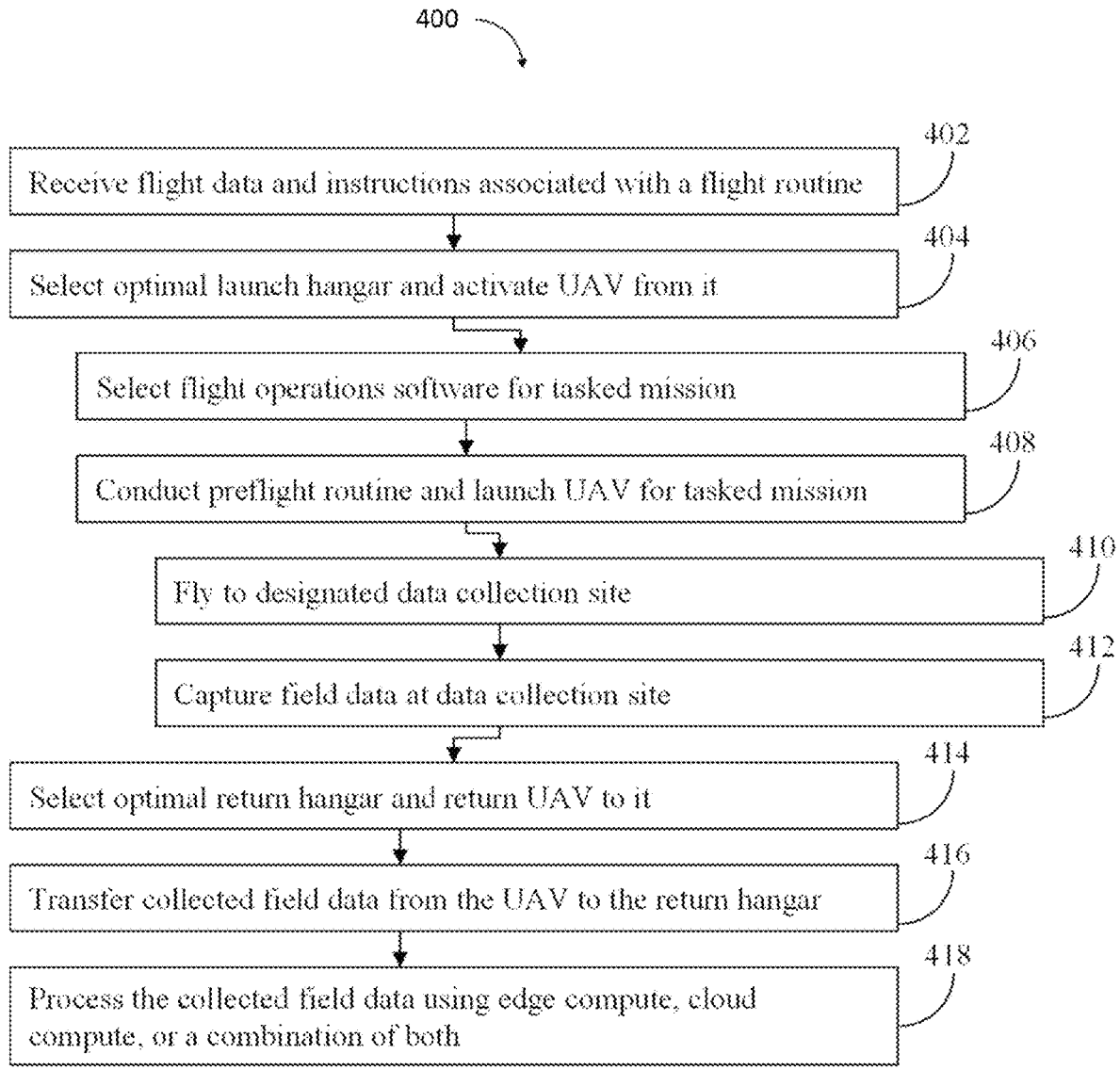
FIG. 4 is a flow chart illustrating an exemplary method that may be performed in some embodiments.

Various aspects of this exemplary embodiment will be described in further detail in relation to an exemplary method below. FIG. 4 is a flow chart illustrating an exemplary method 400 that may be performed in some embodiments. At step 402, the system receives flight data (e.g., a flight data package or some other set of instructional flight data) associated with a data capture flight routine. A data capture flight routine is a flight, trip, or mission wherein the UAV embarks on a flight with the goal of collecting field data at a data capture site. In some embodiments, the goal is to specifically collect three-dimensional field data at a data capture site. In some embodiments, the flight data may include any data related to the data capture flight routine and/or any data necessary for the UAV to carry out its tasks at the data capture site and return to a hangar. The flight data may include, for example, past or current flight logs of the UAV, positional and locational data of the UAV, current weather conditions and/or weather forecasts, regulatory flight restrictions, diagnostic health of UAV components, information about the data to be collected, distance and location information for the data capture site, information about subsequent data capture flight routines to be performed after the then current flight routine, or any other suitable flight data. In some embodiments, the UAV transmits the data to the system, while in others, the system receives the flight data from one or more first and/or third party databases, from the client device (e.g., via a software application), or other suitable source.

At step 404, the system launches a UAV from a launch hangar. Launching a UAV from a launch hangar may include the steps 406 and 408. A launch hangar may be any machine, station, hangar, site, node, port, nest, dock, box, container, location, vehicle, or device which is configured to receive UAVs and launch them on a data capture flight routine to a destination. The launch hangar may be, e.g., a docking station, base station, charging station, launch facility, drone port, launch vehicle, or any other suitable form factor capable of launching a UAV. In some embodiments, the hangar is selected from a hangar network, i.e., a network of remotely interconnected hangars.

At step 406, part of launching the UAV includes selecting flight operations software for the UAV, based on the requirements of the operation. In some embodiments, during flight, the UAV may be operated according to one of a number of flight operations protocols set by flight operations software which may be located locally on the UAV, in the hangar, remotely, in the cloud, or a combination of the above. In some embodiments, the system selects the most appropriate flight operations software for the mission or task of the UAV. In some embodiments, the system selects the software through predefined protocols which may be configured by a user of the software, determined by the system based on one or more assets under inspection, environmental conditions, financial budgets, regulations, any other suitable factor, or, more typically, a combination of factors. In some embodiments, the flight operations software may be switched (i.e., replaced with other flight operations software) via switchable software modules. In varying embodiments, the software may be selected by AI processes, such as machine learning processes, or may be selected manually by one or more users or entities within the system. In some embodiments, the flight instructions from the software are processed within the UAV via computing devices onboard the UAV (e.g., hardware chips embedded within the UAV).

In some embodiments, the flight operations software entails planned flight operations, wherein the flight pattern of the UAV and the data capture process of the UAV are predefined and automated, with a user or entity associated with the UAV having little to no mandatory input to the UAV during its flight. In other embodiments, the flight operations software entails remote operation, whereby the user or entity associated with the UAV takes control of it and operates it remotely, with varying levels of control via user input. Using one or a combination of planned flight and remote operation systems, a UAV can perform a full data collection cycle. Regardless of whether user input is required to perform the operation, a human user always has real-time or substantially real-time override and manual control capabilities in the system.

At step 408, the system may conduct a preflight routine and launch the UAV for a tasked mission. As part of the process for launching the UAV, the system activates the selected flight operations software for operation of the UAV. In some embodiments, the system may activate the flight operations software such as executing a software executable or application on the UAV, at the launch hangar, or elsewhere, either remotely or locally. In some embodiments, the system is configured to install all or a number of components of the flight operations software if any are necessary to be installed prior to activating the flight. Activation of the flight operations software is performed such that the flight operations software instructs the UAV to fly to a data capture site and capture field data, as described in steps 410 and 412 of the method below.

At step 410, the software instructs the UAV to fly to a data capture site associated with the data capture flight routine. In some embodiments, the data capture site is specified in the flight data, while in other embodiments, an end user manually enters information regarding the data capture site into a client device running a flight management application. In some embodiments, the flight operations software accounts for fuel (e.g., the power source of the UAV) expected to be consumed by the trip, actual fuel consumed, fuel remaining onboard, and other metrics. In some embodiments, the fuel or power source is a battery. Additionally, in some embodiments, the flight operations software accounts for battery levels, predicted battery depletion, remaining battery required to complete the data capture flight routine, etc. The flight operations software may be further instructed to make one or more adjustments to the flight data capture routine based on fuel predictions or determinations, or even cancel the flight altogether if necessary and return to the nearest suitable hangar within the hangar network.

At step 412, the software further instructs the UAV to capture field data at the data capture site. The field data may be any piece(s) of data which may be collected, captured, or otherwise acquired by the UAV at the data capture site as part of a data flight capture routine. Field data may include, e.g., images, videos, photos, measurements, calculations, data logs, records, databases, field samples, streaming media, text, virtual reality data, pieces of hardware (e.g., hard drives) or other devices, payloads, or any other suitable field data which may be captured by the UAV.

In some embodiments, data is obtained via a number of sensors within the system. In some embodiments, at least some of the sensors are located near, within, and/or directly on the hangar, while at least some of the sensors are located on and/or within the UAV. In some embodiments, the sensors are placed in a specific arrangement to allow for redundancy of data collected. In various embodiments, the sensors collect input from an aerial perspective, via sensors in and/or on the UAV, and also collect input from a ground perspective, via sensors positioned in, on, and/or near the hangar. In some embodiments, UAVs may have infrared, chemical detection, laser, or vision sensors included. In some embodiments, the sensors obtain positional data on the UAV. In various embodiments, sensors may obtain or generate Red, Green, Blue (RGB) images or video, thermal infrared signatures, gas signatures, Light Detection and Ranging (LIDAR) data, or any other suitable data.

At step 414, the system receives the UAV at a return hangar. In some embodiments, the UAV will automatically (e.g., as instructed by the flight operations software) and/or by user input return to a hangar when it has finished its intended mission, reached a threshold of battery level, reached a threshold data collection volume, experienced a change in environmental conditions, experienced a change in airspace conditions, and/or experienced some other triggering condition. In some embodiments, the UAV keeps track of the battery level needed to return to the closest hangar that is able to receive the UAV. The UAV may take account of this with a margin for safety in either returning automatically to the hangar or notifying the user to provide input for its return. In some embodiments, if the UAV returns to the hangar with an unfinished data capture flight routine, it stores the progress of the data capture flight routine according to one or more objectives or pieces of field data which must be collected in order to resume the data collection where it left off.

When a UAV returns to a hangar, it follows a flight operation protocol to the most appropriate hangar for a precise landing. In various embodiments, this may be the same hangar the UAV launched from, or it may be a different hangar that is deemed more appropriate to receive the UAV, as determined by one or more network optimization algorithms, by user input/override, or some other method. In some embodiments, the identified hangar will receive notification that the UAV is arriving, and will be automatically configured to make available the landing mechanisms, if necessary, to receive the UAV. For example, a hangar may need to bring internal systems out of hibernation, retract environmental coverings, open the landing area, or any number of other preparations. The Precision Landing Module 160, the AI Module 164, and the Network Optimization Module 166 work in conjunction to prepare the selected return hangar for receiving the returning UAV. When a hangar is selected by the AI Module to receive a UAV, an Estimated Time of Arrival (ETA) is calculated for the UAV to arrive at that hangar. The AI Module has the real-time status of each hangar and, in turn, is able to calculate how long it takes for each hangar to move into position to receive a UAV. This calculation is typically already performed as part of the return hangar selection process. The AI Module coordinates so that the hangar moves into position to receive the UAV at the same time as the arrival of the UAV at the hangar.

In some embodiments, the system is configured to coordinate positioning and landing of the UAV at the return hangar. In some embodiments, the system accomplishes this through sensor data it receives from the UAV, the hangar, or both. In some embodiments, at least some of the sensors (e.g., RGB, infrared, ultrasonic) are integrated into computer algorithms, including software (e.g., embedded software within components of the system or within the sensors) incorporating algorithmic models (e.g., detection and classification tasks) within the system. In some embodiments other data from first and third party sources will supplement the UAV and/or hangar data. Collectively, the data used for precision landing may include images, videos, still frames of videos, audio, distance measurements, environmental measurements, signals, or any other suitable type of information in any suitable format. In some embodiments, at least some of the sensors are installed on and/or embedded within the UAV, and at least some of the sensors are installed on, near, and/or within the hangar. In some embodiments, the processing involves manipulation of the media and/or data into modes optimized to be readable and usable by one or more algorithmic models within the system.

Figure 6:
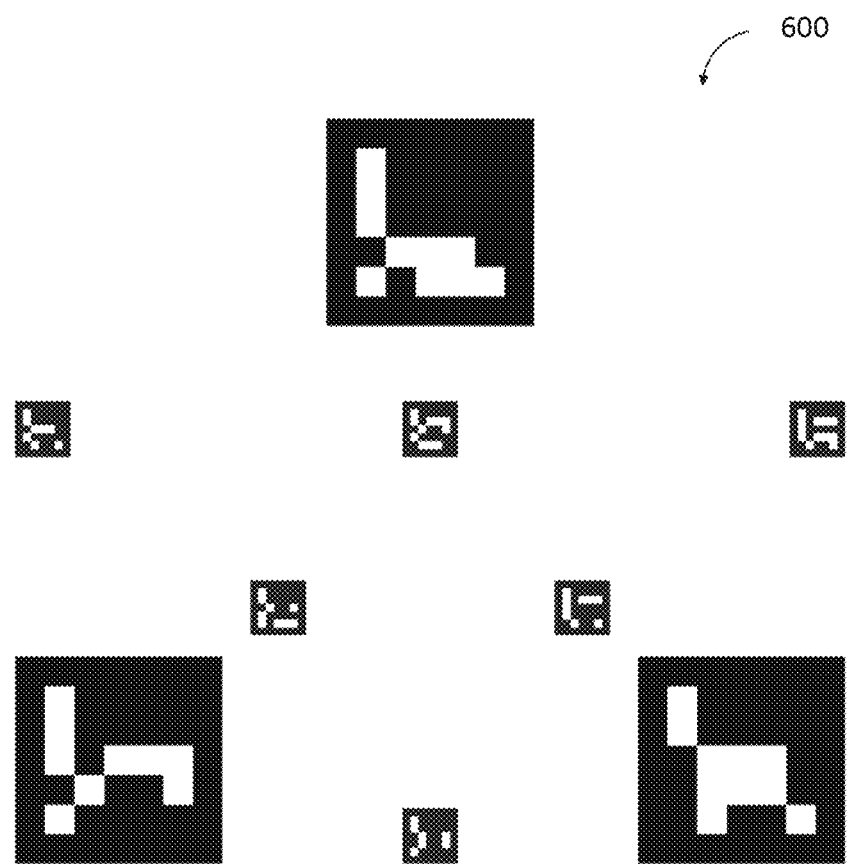
FIG. 6 is a diagram illustrating one example embodiment of a potential pattern set for visual identification of hangars and/or UAVs, in accordance with some embodiments.

FIG. 6 is a diagram illustrating one example embodiment using a visual identification method, in accordance with some embodiments. A pattern set 600 is placed on the hangar landing pad, on another location of the hangar, or in proximity to the hangar. In some embodiments a series of pattern sets are used on and around the hangar. In some embodiments, sensors and/or cameras on or in the UAV can provide visual locking onto unique identifiers of the hangar, such as the unique identifiers shown in FIG. 6. Similarly, sensors on or in the hangar can provide visual locking onto the airframe or unique identifiers on the UAV. In some embodiments, the identifiers are arranged in a differentiated way per hangar or UAV so as to uniquely identify or classify each hangar and each UAV. In one particular example of a UAV landing at a hangar, the UAV obtains the Global Positioning System (GPS) location of the hangar, and sends a signal to the hangar (via a remote network or any suitable communications method) to coordinate the landing. One or more sensors of the UAV and/or hangar identify the UAV in terms of dimensions, shape, positional data, orientation, or any other suitable data relevant for landing, and receives the GPS coordinates for processing as they are updated. The system leverages its sensors and first and third party databases to ascertain environmental factors that may influence the landing process (e.g., windspeed, wind direction, angle of light, intensity of light, temperature, etc.) and inputs them accordingly into the landing algorithm(s). Sensors and processing units, associated with the UAV and hangar, respectively, are configured to reconcile each other and obtain data which is sent and received between the two. The hangar processes the received data and/or collects data to bring the UAV down to the correct location on the landing pad of the hangar. In UAVs that have additional sensors (e.g. ultrasonic, infrared, additional vision, or other), those sensors may be used to assist in landing accuracy.

In some embodiments, the system orients robotic mechanisms into a position to receive the UAV upon its landing, in order to facilitate the completion of a docking process. In some embodiments, the landing technique within the system incorporates one or more sensors on the UAV and/or on the hangar, including, e.g., constantly updated positional and locational data of the UAV, weather conditions, flight restrictions, diagnostic health of UAV components, or any other suitable data for proper landing of the UAV at the hangar.

The robotic mechanisms within the hangar may be any mechanisms configured to receive signals from a processing unit (e.g., a computer processing unit), activate to reorient their locational position(s) within the hangar or site, conform the mechanisms to a specific orientation or pose, manipulate one or more UAVs, components, or other objects in various ways, or any other suitable physical action to be taken within the system with respect to the hangar and/or the UAV. In various embodiments, the robotic mechanisms may include or consist of, e.g., end effectors, actuators, sensors, processing and/or computational components, embedded operational software, controllers, or any other suitable components. In some embodiments, the robotic mechanisms may be configured to receive signals or instructions to move the UAV or another object based on, e.g., control force, pose, velocity, and/or some other method. In a preferred embodiment, the robotic mechanisms can achieve an arbitrary pose, within the limits of the environment (e.g., the hangar or other site), including forces, objects, and other environmental elements. In some embodiments, the robotic mechanisms can control one or more objects, including movement and/or manipulation of the objects (e.g., grasping, ungrasping, or any other suitable movement or manipulation).

Returning to the method 400 diagram of FIG. 4, in some embodiments, once the UAV has precisely landed on the hangar landing pad, the hangar will use one or more sensor(s) and/or camera(s), which are integrated with or communicatively coupled to sensor and computer vision systems, to detect additional data pertaining to the UAV. In some embodiments, the additional data may include dimensional data of the UAV, orientation of the UAV, positional data, or any other suitable attributes or data relevant for grasping and/or manipulating the UAV.

In some embodiments, the hangar uniquely identifies the UAV and configures itself in real-time or substantially real-time to physically handle the UAV appropriately. In some embodiments and for some models of UAV with particular dimensions or other attributes, the hangar will select different robotics modules and/or robotics operating protocols to manipulate components of the UAV based on particular requirements and/or optimizations. Additionally, or alternatively, in some embodiments, AI processes and techniques are applied to intelligently determine the appropriate procedures for handling the UAV.

In some embodiments, the system selects the robotics modules and/or protocols according to one or more tasks which the system detects must necessarily or should optimally be performed. In various embodiments, these tasks may include, e.g., replacing the battery of the UAV upon detecting that the existing battery is below a threshold battery level; performing routine maintenance on one or more components of the UAV; positioning the UAV for wireless or contact charging at a charging location in or near the hangar; or any other suitable task which can be contemplated with respect to the UAV at the hangar.

In some embodiments, the robotic mechanisms at the hangar system conform to grasp the UAV. Once the robotics modules and/or robotics operating protocols are selected for the particular UAV in question, the hangar will begin the robotics processes, i.e., the processing unit within the system will operate according to the robotics modules and/or protocols to send one or more signals to the robotics mechanisms.

In some embodiments, the robotic mechanisms manipulate the UAV in order to perform one or more tasks with respect to the UAV. In some embodiments, in the case of performing a battery replacement for the UAV, the robotic mechanisms will be instructed to perform one or more of the following: remove the existing depleted battery; place the depleted battery into an empty battery bay; activate charging of the depleted battery; select the most fully charged battery in the hangar; insert the charged battery into the UAV; and start the UAV, if the UAV does not start automatically. Other steps or procedures may be contemplated for replacing the battery.

At step 416, the system retrieves the captured field data from the UAV. The UAV offloads the captured data to another source. In some embodiments, the source can be one or more cloud storage servers, databases, physical hard drives present at the hangar, or any other suitable source for receiving and storing data securely. In some embodiments, the captured field data may potentially be very large in size, necessitating one or more big data techniques or processes.

In some embodiments, the UAV will standby for data transfer with the hangar. In some embodiments, the hangar automatically transfers telemetry data (i.e., flight logs and other flight data) and/or field data (i.e., data collected through the UAV at the data capture site) from the onboard UAV memory or storage component onto a memory or storage component of the hangar, cloud storage, or other form of storage. In some embodiments, the data is transmitted through the standard communication channels used for flight operations. In many scenarios, such channels involve a radio and antenna set-up. In some embodiments, a wired or contact connection may be used. In some embodiments, this data movement can be triggered automatically or through user input. The user may also specify the movement of original data or for a layer of processing to happen during the transfer. Software may be incorporated into the system to enable wireless data transmission with a range of different UAV transceivers. In some embodiments, the transmission architecture involves an edge hangar layer.

In some embodiments, once the captured field data has been fully transferred from the UAV, the data on the UAV memory will be erased or formatted. This enables the UAV to restart another data capture flight routine (and consequently, another flight) with full capacity to store data. Should the proceeding operation be coming from a different user, the erasure of data at the UAV level will also ensure one user's data is not under the control of the next user. In some embodiments, as above, this operation can be triggered automatically or through user input.

In some embodiments, the hangar is configured to be a part of, or communicatively interface with, a network. In such configurations, the hangar network and/or other components of the system can function as a distributed data management tool or data management platform. In some embodiments, an individual hangar is deployed as a node (i.e., an edge device which leverages its local computing applications and resources for processing) within a mesh network consisting of a plurality of additional hangars, where the hangar is communicatively coupled to the additional hangars, which are other nodes within the network. Such communication between nodes can take the form of wireless communication (e.g., direct electromagnetic transmission), mediated wireless communication (e.g., through telecommunications infrastructure), a combination thereof, or any other communications architecture. In some embodiments, the UAV is configured to move between the hangar and one or more additional hangars in a coordinated manner based on a set of rules and/or network optimization calculations. In some embodiments, these rules or calculations may be a predefined set of instructions for moving to and from additional hangars, or they may be a set of participant bidding rules wherein one or more entities bid in real-time for route and/or asset inspection prioritization. For example, in a bidding system, the entities may bid to have their data collection routes or assets covered with higher priority and/or at specific times. Conversely, in some embodiments, employing a central logic form, a set of pre-programming is put in place so that UAVs will cover certain data collection routes and assets with a predefined frequency and/or pattern.

At step 418, the system processes the captured field data. In some embodiments, once the data is on the hangar, the hangar can process it using its own compute capabilities at the edge, i.e., with the hangar's computing resources and/or applications. The system is able to process data directly at the edge, deliver raw data into cloud servers for processing, or split the processing responsibilities between the edge hangar and the cloud servers.

In some embodiments, each hangar is equipped with processing capabilities on par with a powerful desktop workstation. Where needed, each hangar is able to integrate directly with a server cabinet in the field to modularly expand computing capabilities at the edge. The overall system has the ability to leverage massively expandable edge processing power in a nodal network configuration. The system has the ability to intelligently decide which data to process at the edge hangar and which to deliver into the cloud. Examples of paths the system can decide to do with data may include: total edge processing, wherein for some use cases, connectivity or other factors may make it infeasible to deliver data into the cloud, resulting in all data and decision-making with that data being performed at the edge; maximum edge processing, wherein the data is primarily processed at the edge and only key information is delivered in the cloud; some edge processing, wherein for some use cases, there is a separation between data which is easy or has minimal computational cost to process, and data which is much more computationally expensive, and wherein the hangar may elect to perform first layer processing at the edge and send only the computationally intensive portion of the data into the cloud for deeper analysis; and no edge processing, wherein computation is difficult and/or connectivity makes cloud uploading trivial, or other factors, resulting in the hangar acting solely as a passthrough entity without any computing at the edge. The system is capable of deciding and executing along the full spectrum of paths between total edge processing and no edge processing. A hangar can remove the data from a UAV and then process and/or upload the data to the cloud on its own time, independent of the continued presence of that UAV within the hangar.

In some embodiments, once the data is transferred, the UAV finishes its operational cycle with, e.g., a freshly replaced battery and a cleared memory, and is now ready to either continue its current operation or remain at the hangar until the next operation is assigned to the UAV. If the UAV was midway through an operation, it automatically returns to where it left off if all other conditions for continued operations are met. If the UAV has finished the operation, or the present environmental conditions do not permit continued operation, it will remain at the hangar. In some embodiments, the hangar closes up to protect the UAV from the elements and secure it at the site.

Figure 5:
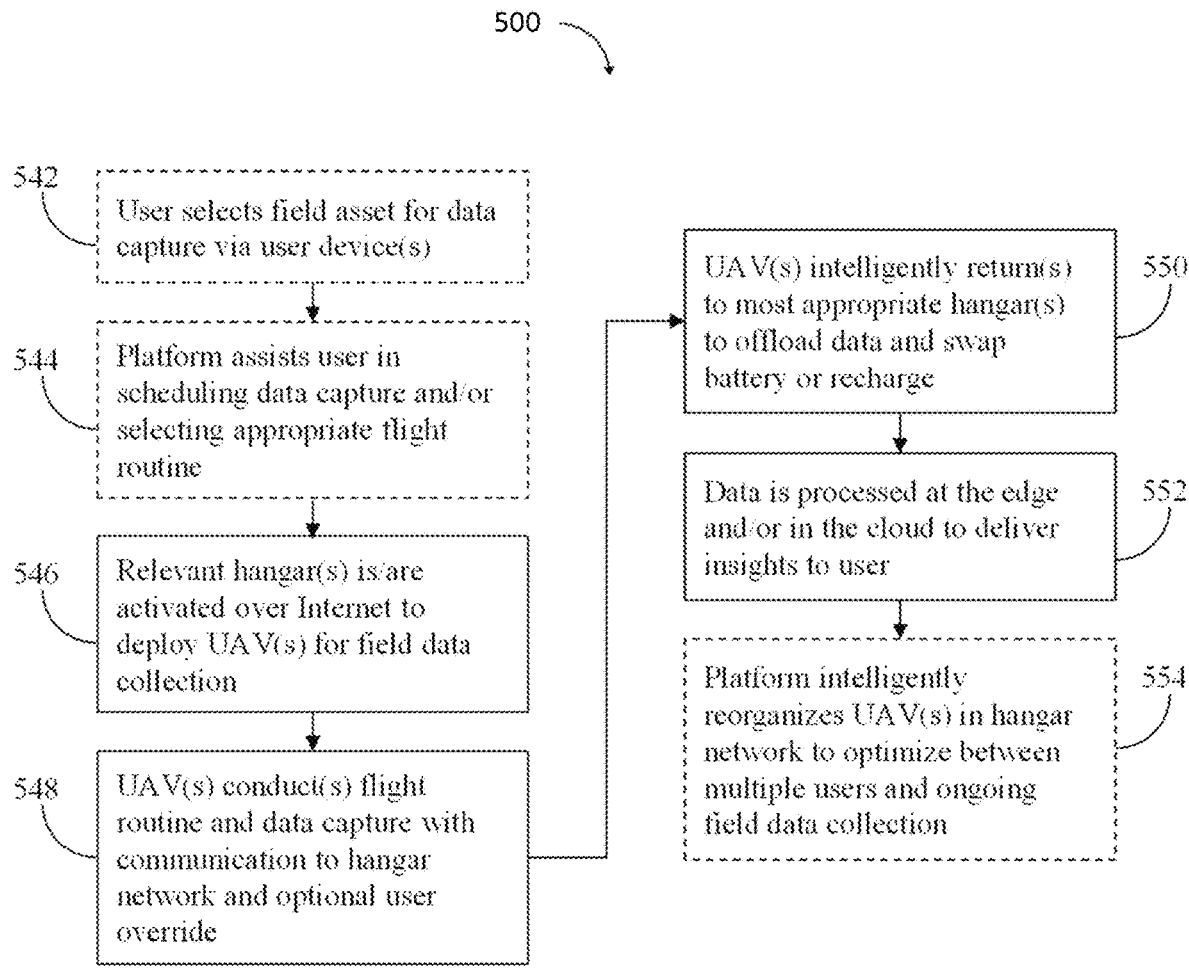
FIG. 5 is a flow chart illustrating an example of a field data collection platform, in accordance with some embodiments.

FIG. 5 is a flow chart illustrating an example of the automated field data collection process 500, in accordance with some embodiments. At step 542, the user selects an asset for data capture. The selection may occur via an application on a client device associated with the user, and with the data collection platform operating in communication with the application.

At step 544, the platform assists the user in scheduling data capture and selecting an appropriate flight operations software. In some embodiments, the platform assists the user in selecting a flight operations software to be used with respect to the data capture flight routine, while in other embodiments, the platform selects the flight operations software without involving the user.

At step 546, the relevant hangar in the network is activated over the Internet to deploy a UAV. In some embodiments, hangars in the hangar network are activated based on which hangars the data capture flight routine is in proximity to, which hangars have capacity in UAV resources, and other criteria that form the calculation of Suitability Scores discussed in detail below.

At step 548, the UAV conducts the data capture flight routine and the data capture process at the data capture site. The UAV is in constant communication with the hangar network, and sends and/or receives data regarding the data capture flight routine, fuel and/or battery levels, weather conditions and unexpected obstacles, and other critical information.

At step 550, the UAV intelligently returns to the most appropriate hangar to offload the captured data and replace the battery as needed, as described above with respect to steps 414 and 416 of FIG. 4.

At step 552, the data is processed at a hangar edge server and/or in the cloud to generate insights pushed to the user, as described with respect to step 418 of FIG. 4. In some embodiments, the system sends insights, i.e., relevant pieces of the processed data and/or generated data based on the processed data, to the user via the application. Telemetry data, metadata, and other information may be sent to the user (e.g., how much and what kind of field data was collected, how long the data capture flight routine took, etc.).

At step 554, the platform intelligently reorganizes the UAV in the hangar network as needed to support multiple end users and ongoing data collection tasks. If multiple end users are using the same UAV, then the system manages the workload of the UAV and optimizes routes and tasks between the end users intelligently. It ensures the security of data from each user and prevents any end user from accessing data, processes, or the identity of other users.

Figure 7:
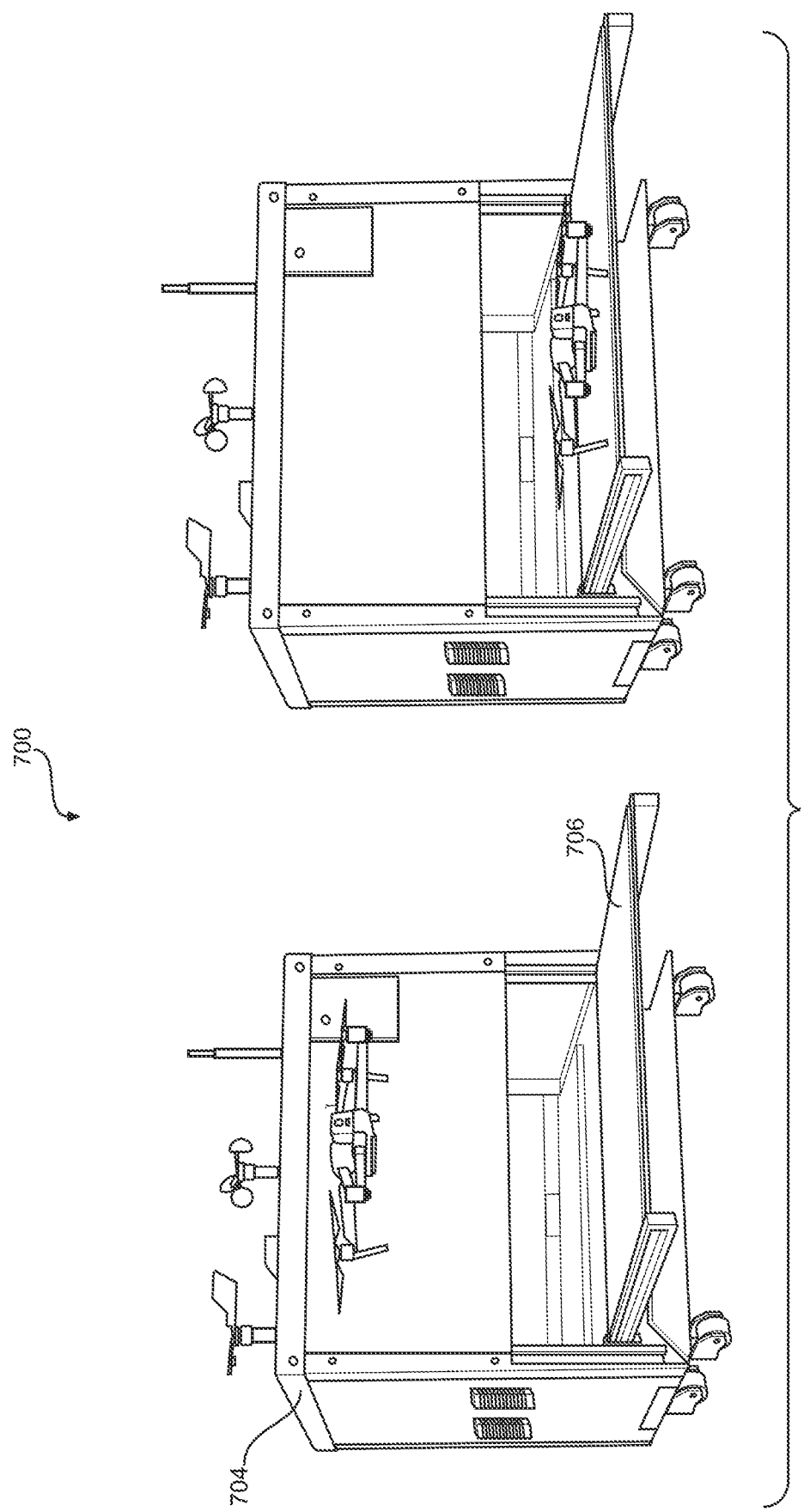
FIG. 7 is a figure illustrating an example embodiment of a hangar for launching one or more UAVs.

FIG. 7 is a figure illustrating an example embodiment of hangars 700 for launching one or more UAVs. The hangars 704 may include a pattern 600 (of FIG. 6) on a surface or a portion 706 of the hangar (e.g., a landing or launch platform). This allows the UAV when returning to identify the hangar for landing, especially where two or more hangars are located in close proximity to one another. The hangar may have onboard sensors such to determine wind speed and direction, and may communicate the wind speed and/or direction to the UAV such that the UAV may use the information in determining how to land onto the hangar 704.

The system may control the operation of the portion 706 of a hangar. For example, the system 100 may cause the portion 706 to extend from the housing or body of the hangar to launch a UAV to perform a mission. Once the UAV is deployed, the system may cause the portion to retract back into the housing of the hangar. The system may determine an approximate time when a UAV will return to a hangar and/or an approximate distance a returning UAV is from the hangar. The system 100 may then cause the portion 706 of the hangar to extend to receive a returning UAV. For example, the system may determine a time window based on the approximate time when a UAV will return (e.g., a two minute window). The system 100 will then extend the landing portion 706 when the time window begins. This functionality allows the landing portion 706 to be in place when the UAV is about to land.

In one embodiment, the hangar is configured with an extendable and retractable roof or door where the UAV is able to launch from within the hangar for deployment to perform an aerial mission. For example, a roof portion of the hangar may be moved into an open position allowing a UAV stationed within the hangar to launch from an internal launch/landing pad of the hangar.

Figure 8:
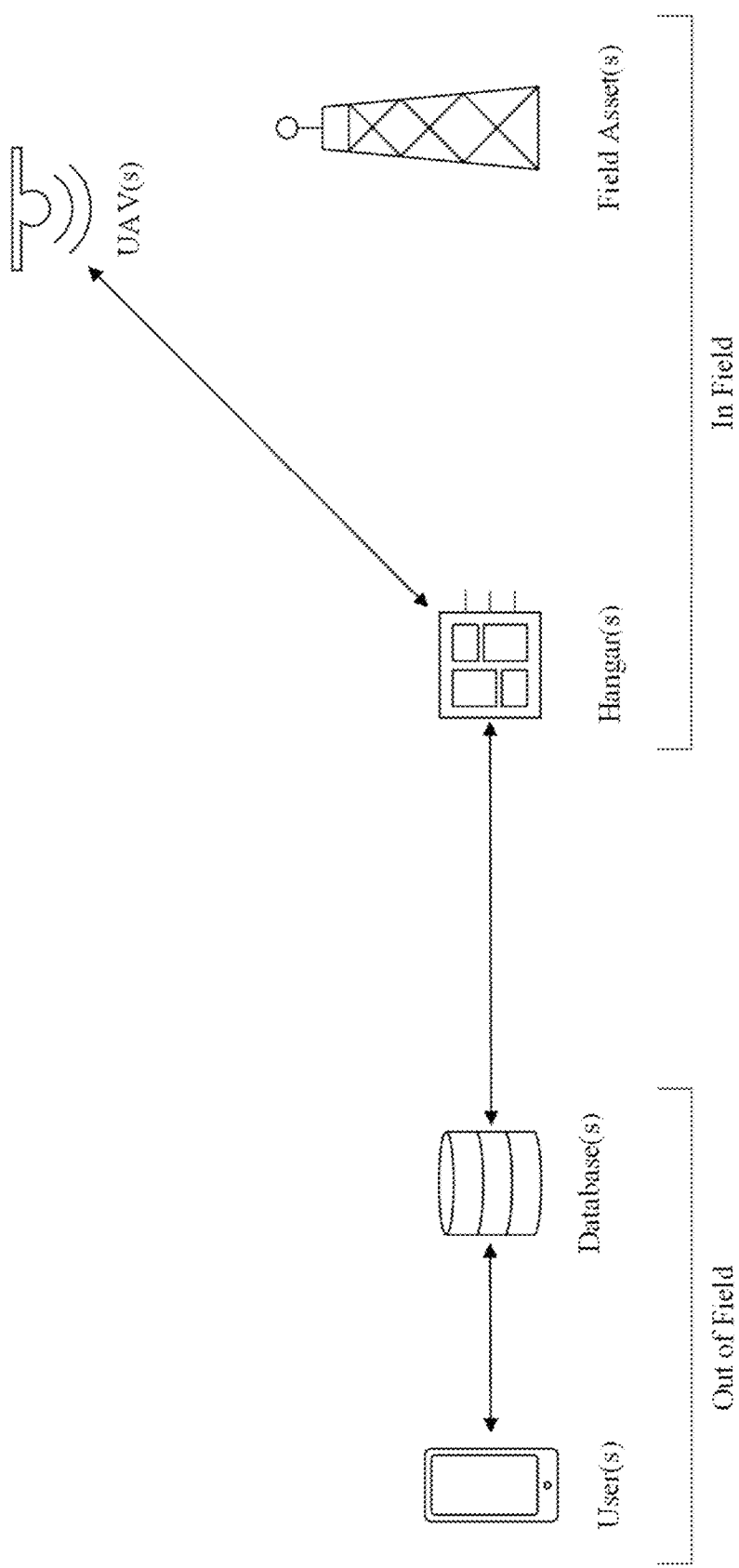
FIG. 8 is a figure illustrating an example embodiment of launching a UAV to inspect a field asset.

FIG. 8 illustrates an example embodiment of launching a UAV to inspect a field asset and the relative position of different elements in the system with respect to the data collection location.

Figure 9:
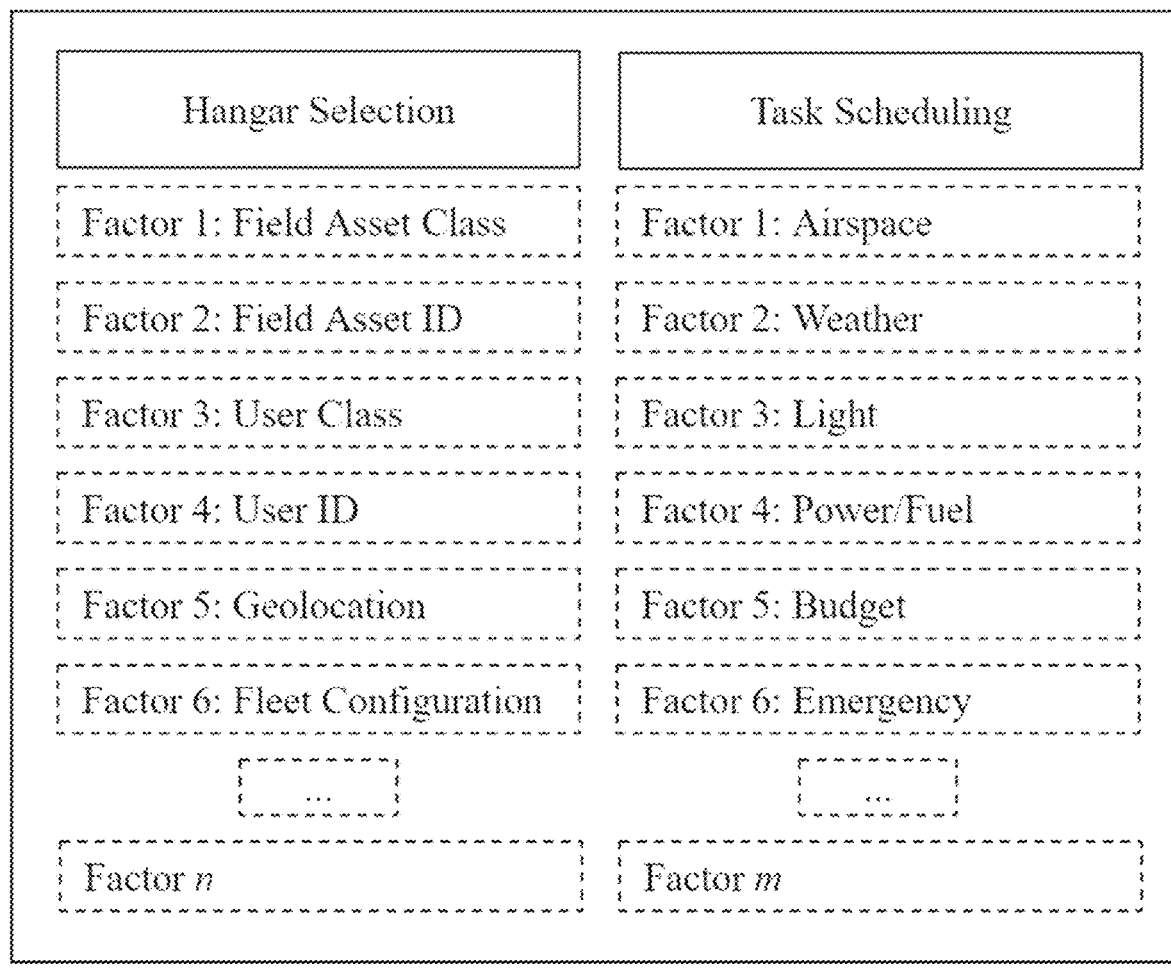
FIG. 9 is a figure illustrating an example embodiment of an artificial intelligence based hangar selection and scheduling process.

FIG. 9 is a figure illustrating an example embodiment of an AI selection engine that may be part of the AI Module 164. When a field data collection task is requested, the AI Module 164 determines the optimal path to accomplish this task in relation to the task's own requirements and in relation to all other tasks in the system and their requirements. As inputs, the AI Module may use data associated with the field asset, field asset owner, its own databases, external databases, and other sources as available. As outputs, the AI Module 164 selects the optimal deployment hangar(s) among a group of one or more hangars and the optimal deployment date(s) and time(s). The AI Module 164 then passes this determination on for the hangar network to schedule, reserve, and activate the task accordingly to deploy one or more UAVs to perform an aerial mission.

Inputs to the AI Module 164 used to determine the optimal deployment hangar(s) include, but are not limited to, a Field Asset Class, Field Asset ID, User Class, User ID, Geolocation, Fleet Configuration. The AI Module 164 may use one or more of the factors in determining which UAV and from which hangar to deploy the UAV to perform the field data collection.

With regard to a Field Asset Class, each field asset contains at least the metadata of its top level classification. This classification assists the AI Module 164 to narrow down the requirements of the task. These requirements in turn inform the best way to accomplish a given task, including but not limited to deciding the UAV and/or payload needed, the flight software and/or analytics software module needed, and the length of flight time needed. Examples of top level class are Agriculture, Telecommunications, Utilities, etc. Examples of optional subclass are Orchard, Lattice Tower, Transmission Line, etc.

With regard to a Field Asset ID, each specific field asset may contain unique metadata that assists the AI Module 164 to gain a closer approximation of the requirements of this particular task. For instance, a specific agricultural field may contain metadata indicating that it should be scanned at a certain altitude only and/or using a specific payload only. The determinations made using information at the Field Asset ID level may override the more generalized determinations made using Field Asset Class.

With regard to a User Class, similar to Field Asset Class, each user entity (e.g., requestor of the field data collection task) contains at least the metadata of its top level classification. This information is used by the AI Module 164 to ensure the planning of the operation is optimized and/or compliant with the given User Class. For instance, when "Government" is the User Class, the task is conducted with only government approved UAVs and processes.

With regard to a User ID, similar to Field Asset ID, each specific user entity may contain unique metadata that assists the AI Module 164 to optimize and/or comply with the user's requirements. For example, a certain corporation may have its unique security protocols; in the event that not all hangars and/or UAVs comply with those protocols, the AI Module 164 narrows down to only those that do comply.

With regard to Geolocation, each field asset is demarcated by one or a set of geolocational markers (e.g., GPS coordinates). Each hangar in the nodal network is similarly demarcated by a geolocational marker. The AI Module 164 narrows down the set of possible deployment hangars to only those within feasible proximity to the field asset in question when accounting for the UAV range and other factors.

With regard to Fleet Configuration, it is possible that not all hangars have appropriate UAVs for the task. It is also possible that not all hangars are ready to deploy a UAV or contain a UAV at the time of task submission. Within the shortlist of potential deployment hangars, the AI Module 164 further narrows down the selection set based on the current and forecasted fleet configuration. In the event that there is no available UAV for the task in the current and forecasted fleet configuration, the AI Module 164 will implement adjustments to the fleet configuration so as to make available an appropriate UAV for the task.

Inputs to the AI Module 164 used to determine the optimal deployment date(s) and time(s) include, but are not limited to, Airspace, Weather, Light, Power and/or Fuel, Budget, and/or Emergency factors.

With regard to Airspace, the AI Module 164 queries and factors in real-time and scheduled airspace changes in order to ensure all flights are in compliance with airspace regulation. For instance, in the United States, the AI Module 164 would query for Temporary Flight Restrictions (TFRs) in the Federal Aviation Administration (FAA) database. These restrictions may be due to the movement of important government personnel, special events, natural disasters, or other unusual events that affect the National Airspace System (NAS)

With regard to Weather, the AI Module 164 uses a combination of first party (e.g., weather stations at each hangar) and third party (e.g., local weather stations) to determine and forecast the weather. The AI Module 164 will schedule deployments only for when the weather conditions are safe for flight for the particular UAV selected. Once a UAV is in flight, the AI Module 164 continues to monitor weather conditions using the aforementioned data sources and supplemented by input from the UAV itself (e.g., wind sensors board the UAV). If weather conditions exceed the safe threshold for the UAV and/or updates in the predictive model suggest that weather conditions would exceed that threshold before the end of the task, the UAV would return to the most optimal return hangar at that time and the task would be rescheduled.

With regard to Light, in some cases, certain lighting conditions are optimal for the imaging required of the task. The AI Module 164 uses a combination of first party (e.g., light meter at each hangar) and third party (e.g., cloud coverage forecasts) to determine and forecast the amount of light available. Similar to the process with weather, the AI Module 164 is able to monitor and recall UAVs if lighting conditions change beyond the required threshold.

With regard to Power and/or Fuel, the AI Module 164 makes a projection on the power and/or fuel required for the UAV to accomplish the task. The actual power and/or fuel levels in the fleet are measured against this projection to optimize the best flight or set of flights to accomplish the task. The AI Module 164 may determine that further refueling, charging, or a replacement of power source is needed before a flight is to activate.

With regard to Budget, in some cases, user entities may spend more on a certain data collection task in order to have it performed at a higher priority. The AI Module 164 allows for users to bid higher for their tasks to achieve this. For example, if a section of oil pipeline is considered high value, a user entity may outbid other users in the vicinity to ensure the field data is collected with the highest priority possible.

With regard to Emergency, in some cases, an unexpected emergency event may require UAVs to prioritize certain tasks higher regardless of monetary budget. The AI Module 164 allows for agreed upon tasks to be understood as "Emergency". For example, if an unexpected forest fire broke out and field data is urgently needed as a result, this task may be prioritized over regular inspection tasks that are using the same resources.

The above sequencing of inputs to the AI Module 164 are exemplary. The AI Module 164 may consider inputs in different sequences depending on the task or the AI Module 164 may optimize against some or all of the inputs at the same time holistically. Furthermore, the AI Module 164 does not necessarily need to determine the optimal deployment hangar(s) before determining the optimal deployment times (s). The AI Module 164 may choose to solve for these two variables in either order or at the same time.

FIG. 10 is a diagram illustrating an example of values calculated for Suitability Scores of various hangars. In some embodiments, the AI Engine (i.e, an AI application which may interact and draw upon resources from the AI Module 164 and the Network Optimization Module 166) uses a Suitability Score to rank and determine the most appropriate launch and return hangar(s). As used herein, a Suitability Score may be a value calculated by the AI Module to assess the suitability or appropriateness of using a particular hangar for launching or receiving a UAV. For example, the system may determine Suitability Scores for each hangar in a group of hangars, and then select a launch hangar from one of the group of hangars where the hangar Suitability Score is above a predetermined threshold value. As depicted in FIG. 10, the system may generate a listing of hangars each having a unique identifier, and a Suitability Score associated with the respective hangars. The system may provide a ranking for the selection of a hangar based on the Suitability Score value. In one embodiment, those hangars with a Suitable Score above a threshold value may then be selected by the system as a prospective or actual launch hangar to deploy a UAV to perform an aerial mission.

When a new data collection task is created, the AI Engine has at least the information on the user entity that receives the deliverable and the field asset for which data will be collected. From that starting point, the AI Engine pools together information regarding the urgency of the task, nature of the task, environmental factors, regulatory factors, current network configuration, projected network configuration, other tasks requested or in-progress, and any other factors relevant to assessing the relevancy of each hangar in the new task. Based on many factors, potentially hundreds or more, the AI Engine assigns hangars in the network a Suitability Score. The scale of this Suitability Score allows for enough gradation that duplicate scores will not be common (e.g., from 1 to 100). The higher the Suitability Score for a particular hangar, the more appropriate it is to deploy from that hangar for the task. The AI Engine may calculate Suitability Scores for all hangars in the network in processing each new task or the AI Engine may use one or more key factors first to narrow down to a subset of hangars to calculate Suitability Scores for. For example, with knowledge of the field asset and its GPS location, the AI Engine may first rule out any hangar outside of a 100 miles radius of the field asset and only calculate scores for those hangars within a 100 mile radius of the field asset. The hangar(s) with the highest Suitability Score will be used to complete the task. In the event that Suitability Scores are tied, further distinguishing calculations may be performed or a randomized tie-breaking algorithm may be used.

Suitability Scores may be calculated each time a hangar selection decision is made. The first set of Suitability Scores is calculated to rank the hangars in the hangar network to select the launch hangar(s). The selected launch hangar(s) may deploy in real-time or be reserved for a later deployment. A UAV launches and performs the aerial mission from the selected or reserved launch hangar. At the point of return (whether due to battery threshold reached, environmental changes, airspace changes, or other factors for returning a UAV), a new set of Suitability Scores are calculated to rank and select the return hangar(s) at that time. If the task is not complete and needs to continue immediately or at a later time, a new set of Suitability Scores are calculated at that time. The hangar and UAV used in this continuation may not be the same as the first launch. A complete set of Suitability Scores may be calculated for all the hangars involved in completing a task before the aerial mission begins. Alternatively, Suitability Scores may be re-calculated each time a hangar decision is made as the aerial mission progresses.

Figure 11:
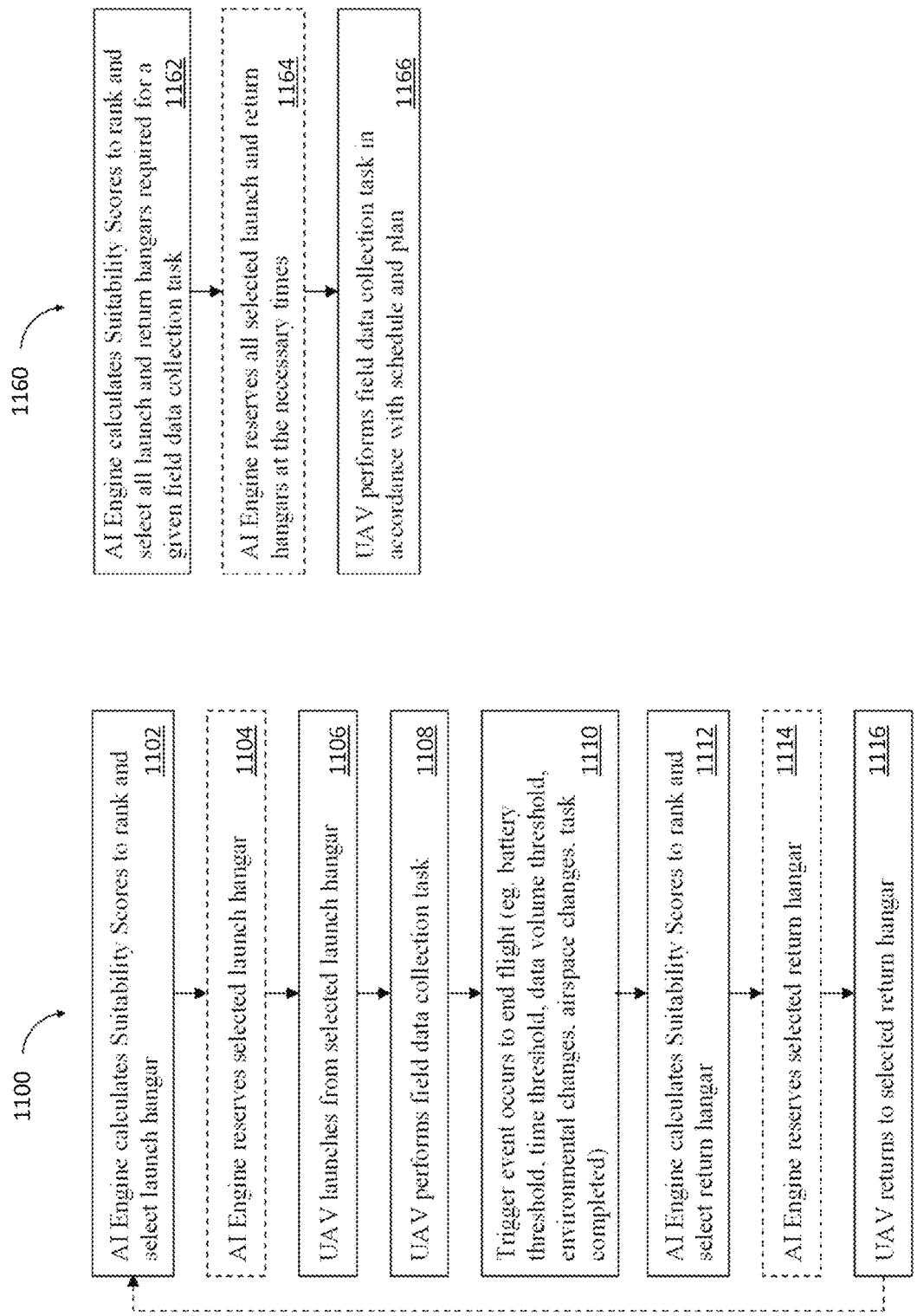
FIG. 11 are flow charts illustrating exemplary methods that may be performed in some embodiments.

FIG. 11 are flow charts illustrating exemplary methods that may be performed in some embodiments. Flow chart 1110 describes an example process of selecting a launch hangar and a return hangar. At step 1102, the AI Engine, drawing on resources from the AI Module 164 and the Network Optimization Module 166, calculates Suitability Scores to rank and select a launch hangar. At optional step 1104, the AI Engine reserves the selected launch hangar. By reserving the selected launch hangar, the hangar will then be reserved for a particular aerial mission, and would not be available for other aerial missions. At step 1106, the UAV is launched and deployed to perform the particular aerial mission. At step 1108, the UAV performs the aerial mission, such as obtaining sensor data about a structure or a geographic area. At step 1110, a triggering event occurs to end the flight of the UAV (e.g., battery threshold below reached, flight time threshold reached, volume and/or amount of data reached, environmental changes may have occurred, airspace changes may have occurred, or the task is completed). At step 1112, the AI Engine calculates Suitability Scores to rank and select a return hangar. At optional step, 1114, the AI Engine reserves the selected return hangar. At step 1116, the deployed UAV returns to the selected return launch and is received for landing.

Flow chart 1160 describes an example process of selecting all launch and return hangars for an aerial mission at the same time. At step 1162, the AI Engine calculates Suitability Scores to rank and select all launch and return hangars required for a given field data collection task or aerial mission. For example, an aerial mission may involve one or multiple UAVs. The AI Engine may determine each of the launch and return hangars that would be required for the aerial mission for deploying and receiving UAVs. At optional step 1164, the AI Engine reserves all selected launch and return hangars at the necessary times. At step 116, the UAV or UAVs perform the aerial mission in accordance with schedule and plan.

Figure 12A:
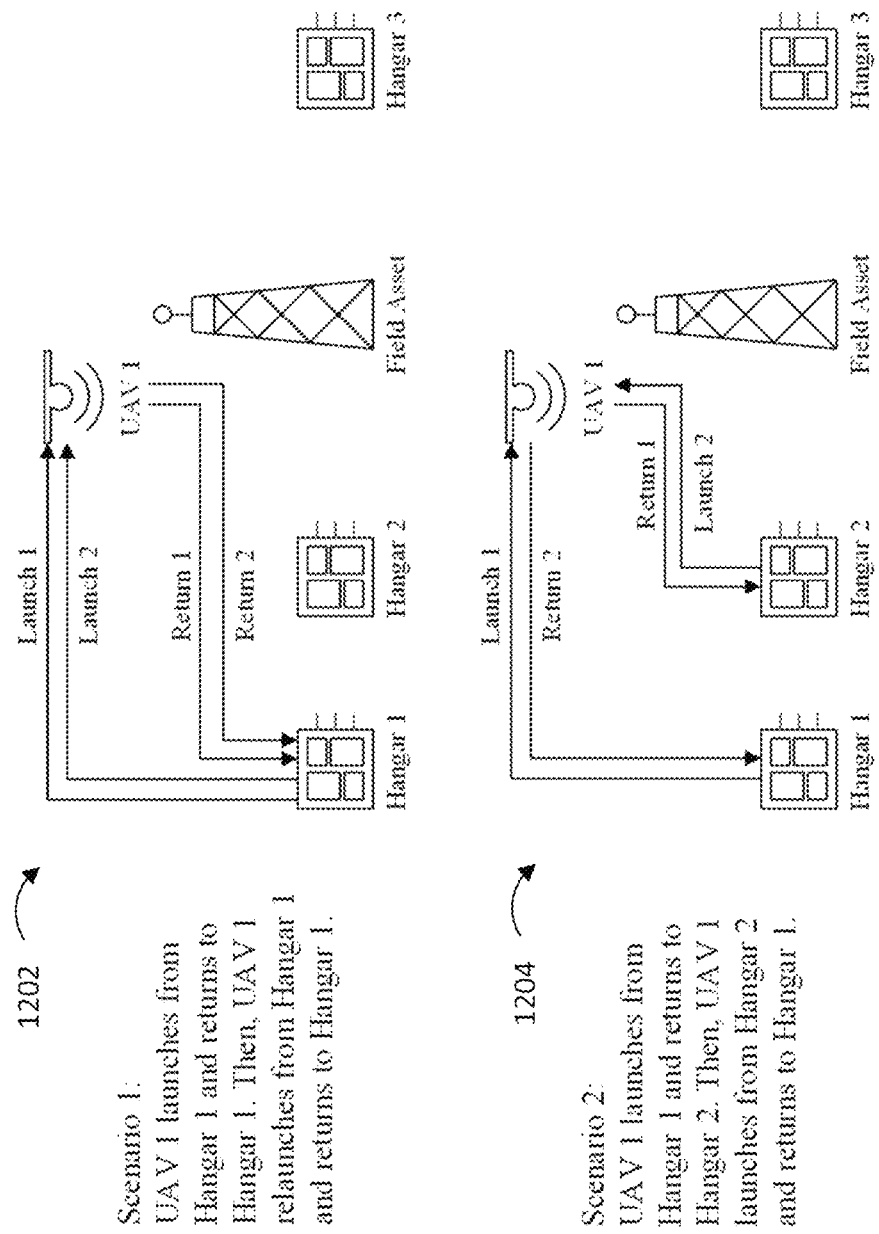
FIG. 12A is a figure illustrating an example embodiment of launching a UAV to inspect a field asset.

FIG. 12A is a figure illustrating an example embodiment of launching a UAV to inspect a field asset. The figure illustrates two example scenarios 1202, 1204 including two launches and two returns of a UAV 1. In the first scenario 1202, the system launches UAV1 from Hangar 1 to perform an aerial mission. UAV 1 then returns to Hangar 1, and Hangar 1 receives UAV 1 for landing. The system then launches, for a second time, UAV 1 from Hangar 1 to perform an aerial mission or continue an existing aerial mission. UAV 1 then returns again to Hangar 1, and Hangar 1 receives UAV 1 for landing. This above discussion is an example where the system may receive a request to perform an aerial mission such as an aerial inspection of a field asset (e.g., a cell tower) to obtain sensor data. Various conditions may occur which then trigger the UAV 1 to return back to the system selected Hangar 1. The system then redeploys from Hangar 1, UAV 1 to continue the aerial mission for the inspection of the field asset.

In the second scenario 1204, the system launches UAV 1 from Hangar 1 to perform an aerial mission. UAV 1 then returns to Hangar 2, and Hangar 2 receives UAV 1 for landing. The system then launches for a second time UAV 1 from Hangar 2 to perform an aerial mission or continue an existing aerial mission. UAV 1 then returns to Hangar 1, and Hangar 1 receives UAV 1 for landing. This above discussion is an example where the system may receive a request to perform an aerial mission such as an aerial inspection of a field asset (e.g., a cell tower) to obtain sensor data. Various conditions may occur which then trigger the UAV 1 to return back to the system selected Hangar 2. The system then redeploys from Hangar 2, UAV to continue the aerial mission for the inspection of the field asset.

Figure 12B:
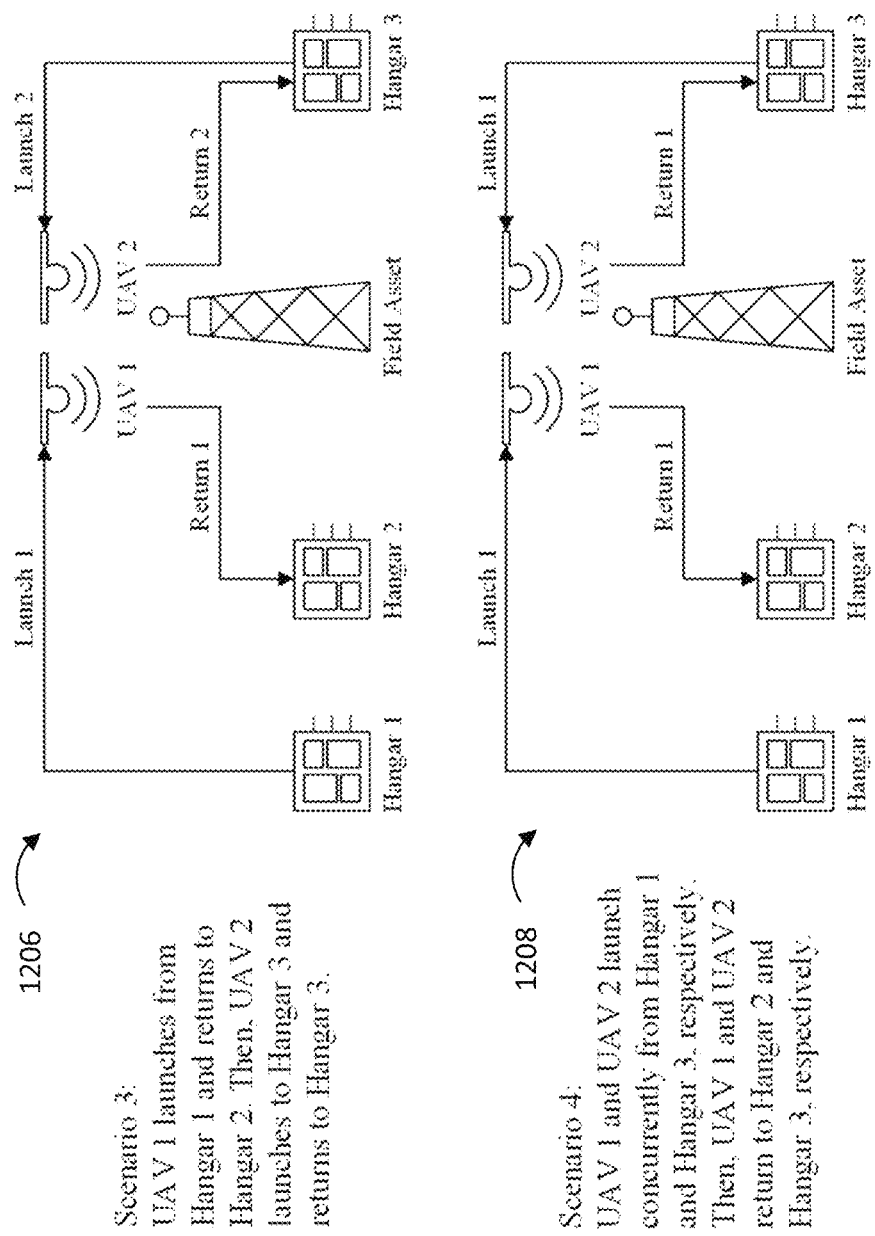
FIG. 12B is a figure illustrating an example embodiment of launching multiple UAVs to inspect a field asset.

FIG. 12B is a figure illustrating an example embodiment of launching multiple UAVs to inspect a field asset. The figure illustrates two example scenarios 1206, 1208 including launches and returns of UAV 1 and UAV 2. In the third scenario 1206, the system launches UAV 1 from Hangar 1 to perform an aerial mission. UAV 1 then returns to Hangar 2, and Hangar 2 receives UAV 1 for landing. The system launches UAV 2 from Hangar 3 to perform an aerial mission or continue an existing aerial mission. UAV 2 then returns to Hangar 3, and Hangar 3 receives UAV 2 for landing. This above discussion is an example where the system may receive a request to perform an aerial mission such as an aerial inspection of a field asset (e.g., a cell tower) to obtain sensor data. Various conditions may occur which then triggers the UAV 1 to return back to the system selected Hangar 2, and which then triggers the UAV 2 to return to Hangar 3. In this example, UAV 1 may be deployed first and then UAV 2 deployed to conduct an aerial mission.

In the fourth scenario 1208, the system launches UAV1 from Hangar 1 and launches UAV 2 from Hangar 3 to perform an aerial mission. The system launches UAV 1 from Hangar 1 and the UAV 1 returns to Hangar 2. The system launches UAV 2 from Hangar 3 and the UAV 2 returns to Hangar 3. This above discussion is an example where the system may receive a request to perform an aerial mission such as an aerial inspection of a field asset (e.g., a cell tower) to obtain sensor data. Various conditions may occur which then triggers the UAV 1 to return back to the system selected Hangar 2, and also may trigger the UAV 2 to return to Hangar 3. In this example, UAV 1 may be deployed contemporaneously with UAV 2 to perform the aerial mission.

Figure 13:
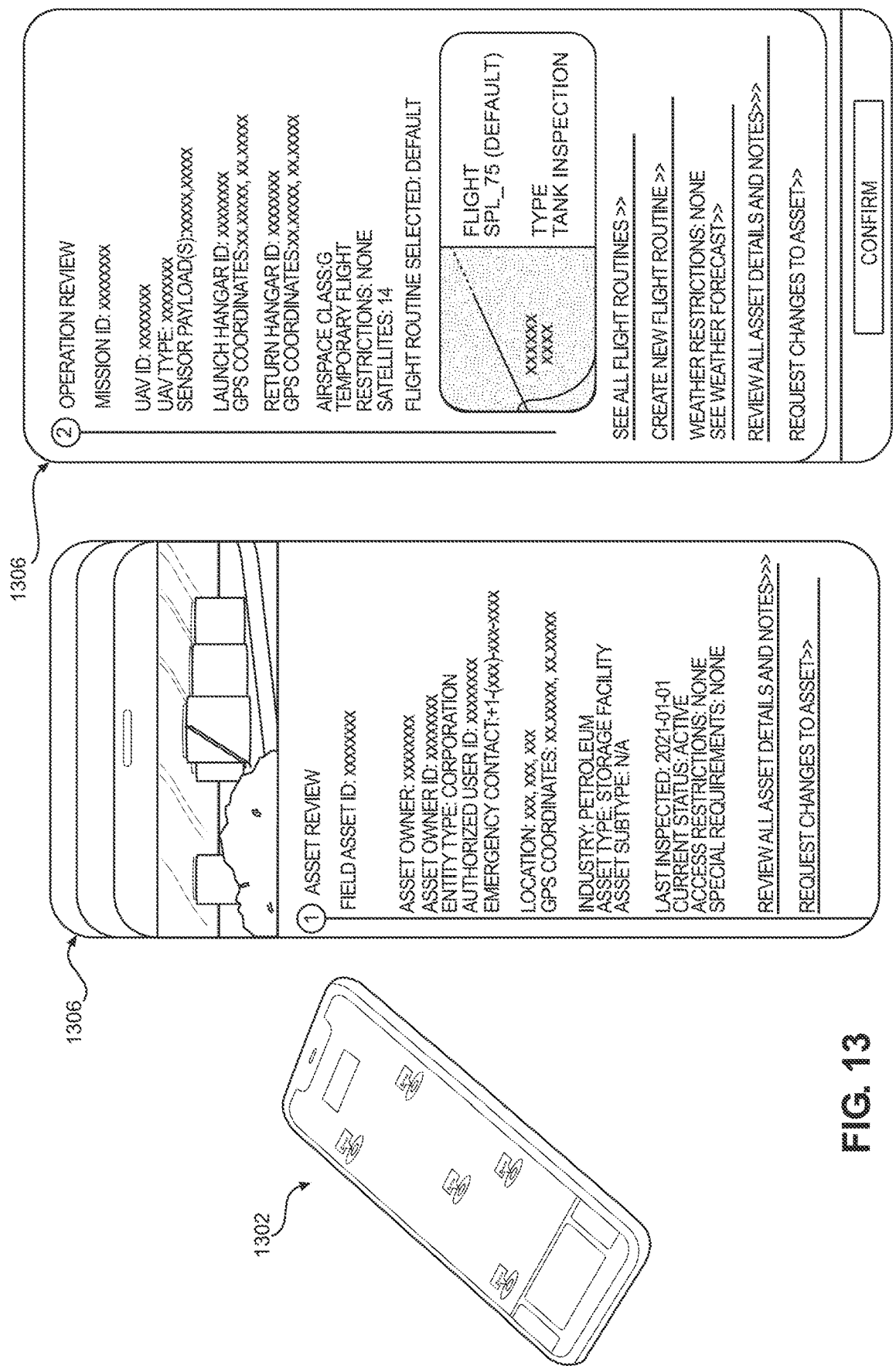
FIG. 13 is a figure illustrating an example embodiment of a client device for managing and controlling one or more UAVs.

FIG. 13 is a figure illustrating an example embodiment of a client device 1302 and user interface 1306 for managing and controlling one or more UAVs, in accordance with some embodiments. The figure illustrates the client device 1302 configured to display a user interface. In some embodiments the user interface can be provided via a local software application, a web-based application, or similar application or service. In some embodiments, a number of menu, map, dashboard, progress, and other components can be displayed. By navigating the user interface, a user of the client device, such as a user or representative of an entity associated with the field asset, can view or perform various tasks. In some embodiments, the user can view data that was collected and/or inferences and insights the system generates based on the data collected. In some embodiments, the user can deploy the UAV immediately from a hangar where it's currently located, schedule a deployment for a future time, schedule a recurring deployment at regular intervals, or customize any other suitable deployment. The client device 1302 may display a user interface showing which of the hangars in a geographic area are online or offline, and the status of their availability to deploy UAVs from the respective hangars.

The user interface 1306 provides for the selection by a user of a particular asset to be inspected. The asset may be from a predetermined list of assets associated with the user's account or for a particular entity or company. The user may select one or more assets to be inspected. The user interface may also receive a particular type of inspection to be performed for the asset as recommended by the AI Engine.

The user interface may present different inspection types for the asset. For example, if the asset is a cellular tower, the inspection types may be a comprehensive inspection, an overview inspection, or some other type of inspection. The comprehensive inspection may require complete inspection where a UAV will obtain sensor data of all of the equipment of the cell tower and require the UAV to spiral the cell tower in specific configurations to obtain the sensor data. An overview inspection may be a brief inspection, for example, just to obtain summary images of the equipment on the top of the cell tower.

The user activates the inspection for the asset. Based on user determination of the field data collection operation, a UAV is deployed from a hangar in real time, instantaneously or near-instantaneously. In some embodiments, this deployment can be achieved remotely, using a convenient device such as the user's mobile phone running an application or accessing a website; in any scenario, the user is an authenticated user. One benefit of the system is that a user does not need to know the particular type of UAV needed, or which sensors a UAV would need to perform the inspection. Instead, the system makes the determination of which of one or more UAVs to deploy based on a number of factors including the inspection type needed, the sensors needed for the inspection, the proximity of an available UAV to the asset location, the overall available flight time to the location, and other factors as considered by the AI Engine above.

Figure 14:
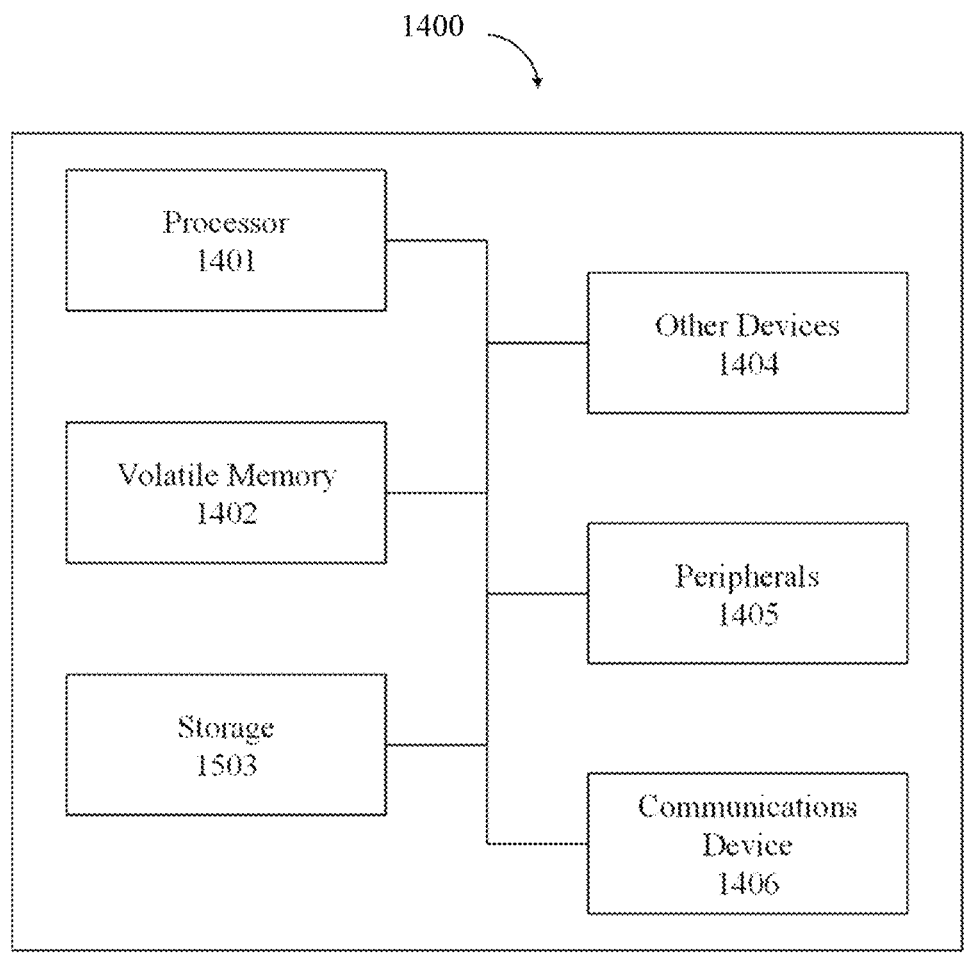
FIG. 14 is a diagram illustrating an exemplary computer that may perform processing in some embodiments.

FIG. 14 is a diagram illustrating an exemplary computer that may perform processing in some embodiments. Exemplary computer 1400 may perform operations consistent with some embodiments. The architecture of computer 1400 is exemplary. Computers can be implemented in a variety of other ways. A wide variety of computers can be used in accordance with the embodiments herein. In one embodiment, the exemplary computer may be integrally formed as part of a hangar.

Processor 1401 may perform computing functions such as running computer programs. The volatile memory 1402 may provide temporary storage of data for the processor 1401. RAM is one kind of volatile memory. Volatile memory typically requires power to maintain its stored information. Storage 1403 provides computer storage for data, instructions, and/or arbitrary information. Non-volatile memory, which can preserve data even when not powered and including disks and flash memory, is an example of storage. Storage 1403 may be organized as a file system, database, or in other ways. Data, instructions, and information may be loaded from storage 1403 into volatile memory 1402 for processing by the processor 1401.

The computer 1400 may include peripherals 1405. Peripherals 1405 may include input peripherals such as a keyboard, mouse, trackball, video camera, microphone, and other input devices. Peripherals 1405 may also include output devices such as a display. Peripherals 1405 may include removable media devices (e.g., hard drives, solid state drives, or flash drives). Communications device 1406 may connect the computer 1400 to an external medium. For example, communications device 1406 may take the form of a network adapter that provides communications to a network. A computer 1400 may also include a variety of other devices 1404. The various components of the computer 1400 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed:

1. A method for deployment from a networked group of two or more hangars an unmanned aerial vehicle (UAV) to perform an aerial mission, the method comprising:
   selecting a hangar to be a first launch hangar, from the networked group of two or more hangars, the hangars being in networked communication with the server, to launch a first UAV to perform the aerial mission, wherein each hangar comprises:
      a moveable housing with a platform for launching or receiving the UAV, a pattern identifier on a surface of the hanger, and a networked computer system with a data storage device, wherein the computer system is configured to receive data from the first UAV;
   deploying from the selected first launch hangar, the first UAV to perform the aerial mission about a structure and/or a geographic area;
   receiving data from and transmitting data to the deployed first UAV by at least one of the hangars or the server while the UAV is performing the aerial mission;
   selecting a hangar, from the group of two or more hangars, to be a first return hangar for landing of the first UAV; and
   receiving the deployed first UAV at the selected first return hangar.

2. The method of claim 1, wherein selecting a hangar to be a first launch hangar comprises:
   providing a ranked list for each hangar of the group of hangars to be the first launch hangar, wherein the ranked list includes a hangar identifier and an associated ranking value for each of the hangars of the group of one or more hangars; and
   selecting the first launch hangar from one of the group of launch hangars where the ranking value is above a predetermined threshold value.

3. The method of claim 2, wherein selecting a hangar to be a first launch hangar comprises:
   selecting a set of possible launch hangars to only those hangars that are within a proximity range to a field asset.

4. The method of claim 1, wherein selecting a hangar to be a first return hangar comprises:
   determining a suitability of a hangar for each of the group of hangars to be a first return hangar; and
   selecting the first return hangar from one of the group of hangars where the selected hangar has been determined as suitable to be used as a return hangar.

5. The method of claim 2, wherein the ranked list is based on a suitability score value.

6. The method of claim 1, further comprising the operations of:
   extending from the housing, a portion of the hanger to configure the hangar to launch the UAV to perform the aerial mission; and
   after deploying the first UAV, retracting the portion of the hanger into the housing.

7. The method of claim 1, further comprising the operations of:
   reserving one of the group of hangars to be the first launch hangar for the aerial mission, and during the reservation precluding the first launch hangar from being used for another aerial mission.

8. The method of claim 1, further comprising the operations of:
reserving one of the group of hangars to be the first return hangar for the aerial mission, and during the reservation precluding the first return hangar from being used for another aerial mission.

9. The method of claim 1, wherein the selected first launch hangar and the selected first return hangar are the same hangars.

10. The method of claim 1, wherein the selected first return hangar and the selected first return hangar are different hangars.

11. The method of claim 1, further comprising the operations of:
selecting a hangar to be a second launch hangar, from the group of one or more hangars, the hangars being in networked communication with the server, to launch a second UAV to perform the aerial mission;
deploying from the selected second launch hangar, the second UAV to perform the aerial mission about a structure and/or a geographic area;
receiving data from and transmitting data to the deployed second UAV by at least one of the hangars or the server while the second UAV is performing the aerial mission;
selecting a hangar, from the group of one or more hangars, to be a second return hangar for landing of the second UAV; and
receiving the deployed second UAV at the selected second return hangar.

12. The method of claim 11, wherein the first UAV and the second UAV are each deployed to concurrently perform together the aerial mission.

13. The method of claim 11, wherein the first UAV returns to the first return hangar after performing a portion of the aerial mission, and the second UAV is deployed from the second launch hangar.

14. The method of claim 1, further comprising:
wherein the deployed UAV returns to the selected return hangar prior to completion of the aerial mission, and
determining another hangar suitability score for each of the group of hangars to be another launch hangar for the selection of a UAV to continue the aerial mission; and
deploying from the selected another launch hangar, a UAV to continue the aerial mission;
wherein the determined another launch hangar may be the same hangar as the first launch hangar or a different hangar from the group of hangars.

15. A system for deploying one or more unmanned aerial vehicles (UAVs) to perform an aerial mission, the system comprising:
a group of two or more networked hangars, each networked hangar comprising:
a moveable housing with an extendable platform for launching or receiving a UAV, and a pattern identifier on a surface of the hanger, and
a networked computer with a data storage device, wherein the computer is configured to receive data from the UAV; and
a server, the server configured to receive a request from a client device to perform an aerial mission, the server configured to perform the operations of:
selecting a hangar to be a first launch hangar, from the group of two or more networked hangars, the hangars being in networked communication with the server, to launch a first UAV to perform the aerial mission;
deploying from the selected first launch hangar, a first UAV to perform the aerial mission about a structure and/or a geographic area;
receiving data from and transmitting data to the deployed first UAV by at least one of the hangars or the server while the UAV is performing the aerial mission;
selecting a hangar, from the group of two or more networked hangars, to be a first return hangar for landing of the first UAV; and
receiving the deployed first UAV at the selected first return hangar.

16. The system of claim 15, wherein selecting a hangar to be a first launch hangar comprises:
determining a hangar ranking for each of the group of hangars to be the first launch hangar; and
selecting the first launch hangar from one of the group of launch hangars where the hangar ranking is above a predetermined threshold value.

17. The system of claim 16, wherein selecting a hangar to be a first return hangar comprises:
determining a hangar ranking for each of the group of hangars to be a first return hangar;
selecting the first return hangar from one of the group of hangars where the hangar ranking is above a predetermined threshold value.

18. The system of claim 16, further comprising the operations of:
reserving one of the group of hangars to be the first launch hangar for the aerial mission, and during the reservation precluding the first launch hangar from being used for another aerial mission.

19. The system of claim 16, further comprising the operations of:
reserving one of the group of hangars to be the first return hangar for the aerial mission, and during the reservation precluding the first return hangar from being used for another aerial mission.

20. The method of claim 1, further comprising the operations of:
wherein the return hangar comprises onboard sensors to determine windspeed and direction, wherein the return hangar is configured to communicate the determined windspeed and direction to the UAV; and
determining a time window based on an approximate time when the UAV will return to the return hanger, and when the determined time window begins, extending the landing portion to receive the UAV.

21. The method of claim 1, further comprising the operations of:
displaying, via a client device, a user interface depicting an indication of a field asset identifier, a launch hangar identifier and a return hangar identifier.

22. The system or claim 16, wherein the return hangar comprises onboard sensors to determine windspeed and direction, and wherein the return hangar is configured to communicate the determined windspeed and direction to the UAV, and configured to determine a time window based on an approximate time when the UAV will return to the return hanger, and when the determined time window begins, extending the landing portion to receive the UAV.

23. The system or claim 16, further comprising:
an application configured to display a user interface depicting an indication of a field asset identifier, a launch hangar identifier and a return hangar identifier.

* * * * *